US012579710B2

(12) United States Patent
Yang et al.

(10) Patent No.: US 12,579,710 B2
(45) Date of Patent: Mar. 17, 2026

(54) TRANSFORMING CONTENT ACROSS VISUAL MEDIUMS USING ARTIFICIAL INTELLIGENCE AND USER GENERATED MEDIA

(71) Applicant: Microsoft Technology Licensing, LLC, Redmond, WA (US)

(72) Inventors: Chenguang Yang, Seattle, WA (US); Xuan Li, Bellevue, WA (US); Peng Qin, Redmond, WA (US); Michael James Bentley, Bellevue, WA (US); Michael Louis Urciuoli, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 617 days.

(21) Appl. No.: 18/161,485

(22) Filed: Jan. 30, 2023

(65) Prior Publication Data

US 2024/0257420 A1 Aug. 1, 2024

(51) Int. Cl.
*G06F 40/166* (2020.01)
*G06F 40/151* (2020.01)
(Continued)

(52) U.S. Cl.
CPC ............ *G06T 11/60* (2013.01); *G06F 40/151* (2020.01); *G06F 40/186* (2020.01); *G06F 40/30* (2020.01); *G06F 40/58* (2020.01)

(58) Field of Classification Search
CPC ...... G06T 11/60; G06F 40/151; G06F 40/186; G06F 40/30; G06F 40/58; G06F 40/194;
(Continued)

(56) References Cited

U.S. PATENT DOCUMENTS 8,977,293 B2 * 3/2015 Rodriguez ............. G01C 21/36
455/456.1
11,216,161 B2 1/2022 Balasubramanian
(Continued)

FOREIGN PATENT DOCUMENTS

CN 120017926 A * 5/2025 ..... H04N 21/440236
WO WO-2021021624 A1 * 2/2021 .......... G06V 30/226
WO 2022010579 A1 1/2022

OTHER PUBLICATIONS

International Search Report and Written Opinion received for PCT Application No. PCT/US2024/010102, May 27, 2024, 21 pages.
(Continued)

*Primary Examiner* — Hassan Mrabi
(74) *Attorney, Agent, or Firm* — NovoTechIP International PLLC

(57) ABSTRACT

A data processing system implements techniques for automatically generating a presentation from a source document or a selection of a portion thereof. These techniques segment the document into a plurality of segments based on subject matter and transform those segments into textual content for slides for the presentation. The techniques also may selectively search for AI-generated and non-AI generated imagery to include in the slides for the presentation. These techniques provide safeguards for ensuring that AI-generated imagery is not utilized in instances in which such imagery would be inappropriate, misleading, or offensive. The techniques also provide means for user-specific control over when AI-generated imagery is utilized in the slides of an automatically generated presentation.

20 Claims, 17 Drawing Sheets

(51) Int. Cl.
G06F 40/186 (2020.01)
G06F 40/30 (2020.01)
G06F 40/58 (2020.01)
G06T 11/60 (2006.01)

(58) Field of Classification Search
CPC .... G06F 40/103; G06F 40/106; G06F 40/166;
G06F 40/56; G06N 3/0455; G06N 3/09;
G06N 3/0475
See application file for complete search history.

(56) References Cited

U.S. PATENT DOCUMENTS

| | | | | |
|---|---|---|---|---|
| 2014/0357312 A1* | 12/2014 | Davis | ..................... | H04N 23/70 |
| | | | | 455/550.1 |
| 2015/0024800 A1* | 1/2015 | Rodriguez | ........ | H04M 1/72403 |
| | | | | 455/556.1 |
| 2015/0286873 A1* | 10/2015 | Davis | ..................... | G06F 1/1694 |
| | | | | 382/103 |
| 2017/0257474 A1* | 9/2017 | Rhoads | ................. | H04W 4/027 |
| 2018/0196784 A1* | 7/2018 | Kumar | ................. | G06F 3/0482 |
| 2020/0183552 A1* | 6/2020 | Balasubramanian | ..... | G06F 3/14 |
| 2023/0055241 A1* | 2/2023 | Zionpour | .............. | G06F 40/186 |
| 2023/0161949 A1* | 5/2023 | Yang | ..................... | G06F 16/954 |
| | | | | 715/255 |
| 2024/0126981 A1* | 4/2024 | Shahinian | ............... | G06F 40/40 |
| 2025/0284876 A1* | 9/2025 | Dolan | ................. | G06N 3/0895 |

OTHER PUBLICATIONS

Sefid et al., "SlideGen an Abstractive Section-Based Slide Generator for Scholarly Documents", Proceedings of the 29th ACM Joint Meeting on European Software Engineering Conference and Symposium on the Foundations of Software Engineering, ACMPUB27, New York, NY, USA, Aug. 16, 2021, pp. 1-4.
TSU-JUI FU, et al., "DOC2PPT: Automatic Presentation Slides Generation from Scientific Documents", Arxiv.org, Cornell University Library, 201 Olin Library Cornell University Ithaca, NY 14853, Feb. 14, 2021, pp. 1-16.
International Preliminary Report on Patentability received for PCT Application No. PCT/US2024/010102, mailed on Aug. 14, 2025, 14 pages.

* cited by examiner

Figure 4I:
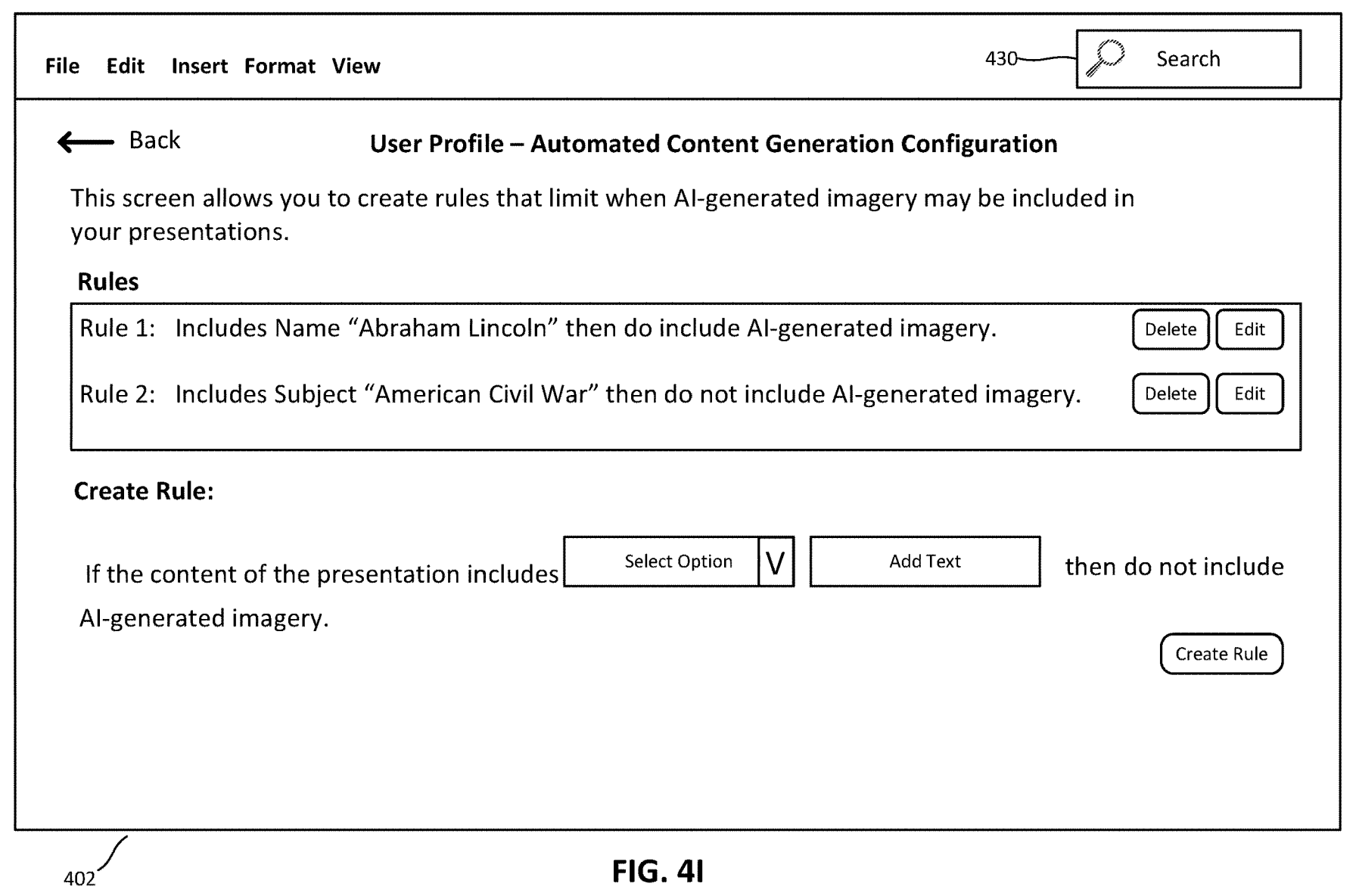

File   Edit   Insert   Format   View

◄── Back

Search

430

User Profile – Automated Content Generation Configuration

This screen allows you to create rules that limit when AI-generated imagery may be included in your presentations.

Rules

Rule 1:   Includes Name "Abraham Lincoln" then do include AI-generated imagery.        Delete   Edit Rule 2:   Includes Subject "American Civil War" then do not include AI-generated imagery.    Delete   Edit

Create Rule:

If the content of the presentation includes    Select Option  ∨    Add Text    then do not include AI-generated imagery.

Create Rule

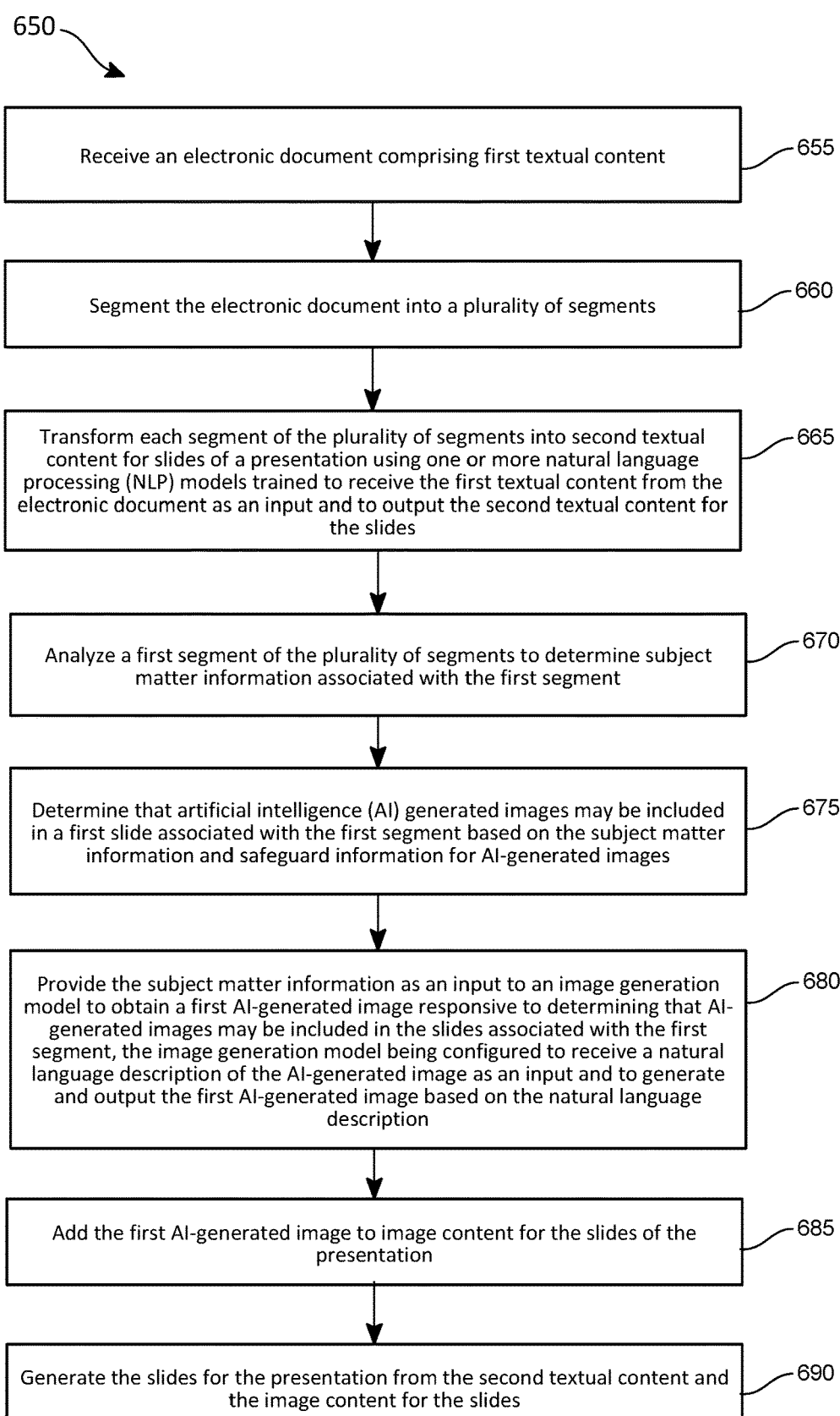

650

Receive an electronic document comprising first textual content — 655

Segment the electronic document into a plurality of segments — 660

Transform each segment of the plurality of segments into second textual content for slides of a presentation using one or more natural language processing (NLP) models trained to receive the first textual content from the electronic document as an input and to output the second textual content for the slides — 665

Analyze a first segment of the plurality of segments to determine subject matter information associated with the first segment — 670

Determine that artificial intelligence (AI) generated images may be included in a first slide associated with the first segment based on the subject matter information and safeguard information for AI-generated images — 675

Provide the subject matter information as an input to an image generation model to obtain a first AI-generated image responsive to determining that AI-generated images may be included in the slides associated with the first segment, the image generation model being configured to receive a natural language description of the AI-generated image as an input and to generate and output the first AI-generated image based on the natural language description — 680

Add the first AI-generated image to image content for the slides of the presentation — 685

Generate the slides for the presentation from the second textual content and the image content for the slides — 690

FIG. 6B

TRANSFORMING CONTENT ACROSS VISUAL MEDIUMS USING ARTIFICIAL INTELLIGENCE AND USER GENERATED MEDIA

BACKGROUND

Generating presentation content often includes drafting textual content, selecting imagery, and laying out this textual content and imagery in a manner that provides a compelling and interesting content for the intended audience of the presentation. Often, the presentation is associated with other content, such as a paper that has been drafted by the presenter, and the presenter must manually distill this other content down into a short summary suitable for inclusion on the slides of the presentation. Furthermore, the user may struggle to create or find appropriate imagery to include in the presentation. Hence, there is a need for improved systems and methods generating presentation content that includes textual content and imagery.

SUMMARY

An example data processing system according to the disclosure may include a processor and a machine-readable medium storing executable instructions. The instructions when executed cause the processor to perform operations including receiving an electronic document comprising first textual content; segmenting the electronic document into a plurality of segments; transforming each segment of the plurality of segments into second textual content for slides of a presentation using one or more natural language processing (NLP) models trained to receive the first textual content from the electronic document as an input and to output the second textual content for the slides; analyzing a first segment of the plurality of segments to determine subject matter information associated with the first segment; determining that artificial intelligence (AI) generated images may be included in a first slide associated with the first segment based on the subject matter information associated with the first segment; providing the subject matter information as an input to an image generation model to obtain a first AI-generated image responsive to determining that AI-generated images may be included in the slides associated with the first segment, the image generation model being configured to receive a natural language description of the AI-generated image as an input and to generate and output the first AI-generated image based on the natural language description; adding the first AI-generated image to image content for the slides of the presentation; and generating the slides for the presentation from the second textual content and the image content for the slides.

An example data processing system according to the disclosure may include a processor and a machine-readable medium storing executable instructions. The instructions when executed cause the processor to perform operations including receiving an electronic document comprising first textual content; segmenting the electronic document into a plurality of segments; transforming each segment of the plurality of segments into second textual content for slides of a presentation using one or more natural language processing (NLP) models trained to receive the first textual content from the electronic document as an input and to output the second textual content for the slides; analyzing a first segment of the plurality of segments to determine subject matter information associated with the first segment, determining that artificial intelligence (AI) generated images may be included in a first slide associated with the first segment based on the subject matter information and safeguard information for AI-generated images; providing the subject matter information as an input to an image generation model to obtain a first AI-generated image responsive to determining that AI-generated images may be included in the slides associated with the first segment, the image generation model being configured to receive a natural language description of the AI-generated image as an input and to generate and output the first AI-generated image based on the natural language description; adding the first AI-generated image to image content for the slides of the presentation; and generating the slides for the presentation from the second textual content and the image content for the slides.

An example method implemented in a data processing system for automatically generating presentation content includes receiving an electronic document comprising first textual content; segmenting the electronic document into a plurality of segments; transforming each segment of the plurality of segments into second textual content for slides of a presentation using one or more natural language processing (NLP) models trained to receive the first textual content from the electronic document as an input and to output the second textual content for the slides; analyzing a first segment of the plurality of segments to determine subject matter information associated with the first segment; determining that artificial intelligence (AI) generated images may be included in a first slide associated with the first segment based on the subject matter information associated with the first segment; providing the subject matter information as an input to an image generation model to obtain a first AI-generated image responsive to determining that AI-generated images may be included in the slides associated with the first segment, the image generation model being configured to receive a natural language description of the AI-generated image as an input and to generate and output the first AI-generated image based on the natural language description; adding the first AI-generated image to image content for the slides of the presentation; and generating the slides for the presentation from the second textual content and the image content for the slides.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A-4I are diagrams of an example user interface of a presentation application that incorporates the techniques provided herein to generate presentation content.

FIG. 6B is an example flow chart of another example process for generating presentation content according to the techniques provided herein.

DETAILED DESCRIPTION

Techniques for transforming content across visual mediums using artificial intelligence and user-generated media are provided. These techniques include artificial intelligence (AI) assisted content generation and design tools that consider user preference for AI-generated media or user-generated media when producing transformed content from source content. In some implementations, the source content includes electronic documents, web pages, and/or other types of electronic content that includes text and/or images from which a user would like to automatically generate a slide presentation. These techniques consider document attributes, content subject matter, and artistic design factors to automatically create visually compelling slides for the presentation. These techniques also consider the user's intent and/or direction when creating the slides. Additional considerations, such as but not limited to historic documents that are similar in content, design, and/or use case may also be considered in some implementations. Furthermore, these techniques consider whether an enterprise has a set of templates, style guides, and/or other design rules and factors those into the slide creation and/or layout process.

These techniques may utilize on or more machine learning models trained to generate various aspects of the presentation, such as the title, a summary of the presentation content, bullet point items for slides, a presentation transcript and/or speaker prompts, and imagery. These techniques provide safeguards for ensuring that AI-generated content is not inappropriate or offensive by preventing AI-based content from automatically being generated for certain subject matter and/or for certain use cases. In some implementations, a global blocklist of prohibited subject matter for AI-generated imagery is maintained that is applied for all users. In some implementations, users may specify subject matter and/or user cases in which the users do not wish to utilize AI-generated content in the presentations being automatically generated for them.

The techniques provided herein utilize models that have translation capabilities in some implementations. In such implementations, the source content may be in a first language and the user may specify a second language in which the presentation content is to be automatically created. A technical benefit of this approach is that the user can generate a presentation for an audience that does not speak and/or read the language of the source content. The user may also automatically generate a presentation from a content source that the user does not know so that the user can obtain a summary of the content source in a language with which the user is familiar. These and other technical benefits of the techniques disclosed herein will be evident from the discussion of the example implementations that follow.

Figure 1:
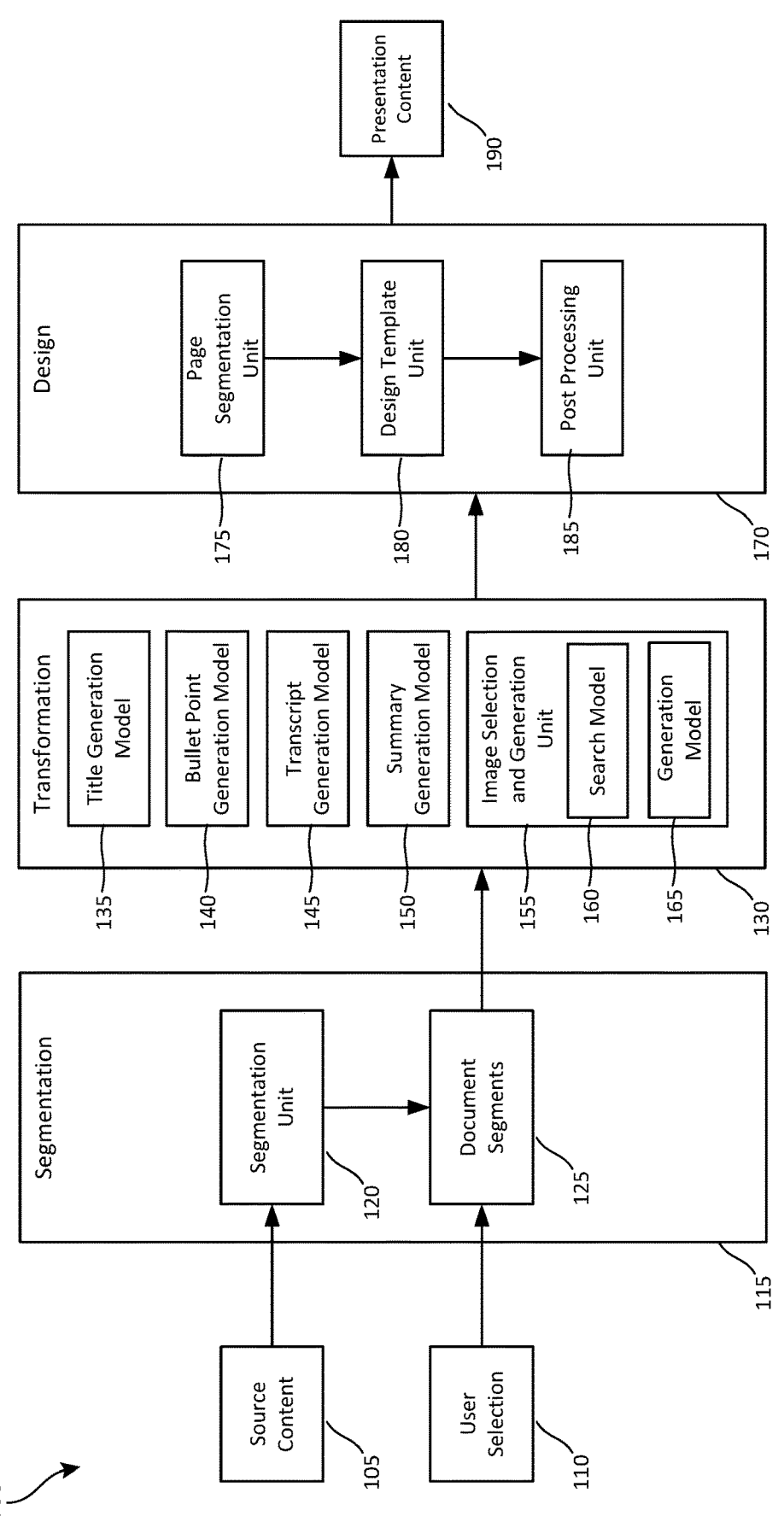
FIG. 1 is a diagram showing an example computing environment in which the techniques for utilizing machine learning driven mechanisms for generating presentation content using AI-generated and/or non-AI-generated content provided herein may be implemented.

FIG. 1 is a diagram showing an example computing environment 100 in which the techniques for utilizing machine learning driven mechanisms for generating presentation content using AI-generated and/or non-AI-generated content provided herein may be implemented. The computing environment 100 may be implemented in a cloud-based computing environment, such as the presentation service shown in FIG. 2, which will be described in detail in the examples which follow. The computing environment 100 includes a three-stage approach for generating presentation content 190 from source content 105 and/or user selection 110. The example implementation shown in FIG. 1 includes a segmentation stage 115, a transformation stage 130, and a design stage 170.

The segmentation stage 115 is configured to receive source content 105 and/or a user selection 110 as an input. The source content 105 may include both textual content and/or images. The source content 105 is electronic content, such as but not limited to word processing documents, spreadsheets, web pages, and/or other types of documents. In some implementations, the source content 105 is identified using a Universal Resource Locator (URL) or other type of link or address indicating where the source content 105 may be obtained from. The user selection may be a selection of a portion of the source content 105 or another electronic content. The user selection 110 may include a section of the source content 105 or other electronic content that has been highlighted or otherwise identified by the user. The user selection 110 may include one or more sentences, paragraphs, sections, pages, or other portions of the source content 105 or other electronic content.

In some implementations, the source content 105 and/or the user selection 110 is in a first language but the user specifies a second language in which the presentation content 190 is to be generated. The models used by the transformation stage 130 are configured to translate the textual content from the source content 105 and/or the user selection 110 into the second language.

In some implementations, a third input (not shown) may be provided. The third input is presentation content that has already been created either automatically using the techniques described herein and/or is user-generated slide content. In such implementations, the user may select the source content 105 and/or the user selection 110 from a source content to be used to automatically generate additional slides for the existing presentation. The transformation stage 130 and the design stage 170 consider the design attributes of the existing presentation when determining the design of the presentation content 190. These design attributes may include but are not limited to color scheme, slide layout, font and font attributes, and/or other attributes of the slides of the presentation content 190.

The segmentation stage 115 includes a segmentation unit 120. The segmentation unit 120 is configured to divide the source content 105 into smaller segments for processing by the transformation stage 130. In some implementations, the segmentation unit 120 is configured to analyze the source content 105 using a natural language processing (NLP) model trained to segment the source content into segments and to obtain the document segments 125 as an output of the model. In some implementations, the segmentation model is trained to segment the source content 105 by topic or subject matter. In a non-limiting example, the source content is a web page about the city of Seattle. The segmentation model in this example divides the contents of the web page up based on the subject matter, such as history of the city, demographic information, geographic information, and attractions. Each of the subject matters may be used to generate one or more pages of presentation content 190 by the transformation stage 130. In other implementations, the segmentation unit 120 is configured to segment the source content 105 based on section headers within the document and/or based on paragraph.

In some implementations, the segmentation unit 120 also analyzes the user selection 110 and segments the user selection 110 as necessary. The user selection 110 may incorporate multiple topics, document sections, paragraphs, or other logical segments of the document. Returning to the non-limiting example discussed above, the user selection 110 includes most of the web page about the city of Seattle. The selected portion of the web page includes content associated with multiple topics, such as the history of the city and major attractions. Segmenting the user selection 110 such that the content associated with these topics falls into separate document segments of the document segments 125 helps facilitate the generation of content in the transformation stage 130 by ensuring that related content is grouped together into the document segments 125.

The transformation stage 130 is configured to process the document segments 125 generated by the segmentation stage 115 and to transform the document segments 125 into content to be included in the presentation content 190. The transformation stage 130 is configured to generate textual content for the presentation. The transformation stage 130 also obtains AI-generated imagery and/or non-AI-generated imagery to incorporate into the presentation content 190, in some implementations. In the example implementation shown in FIG. 1, the transformation stage 130 includes a title generation model 135, a bullet point item generation model 140, a transcript generation model 145, a summary generation model 150, and image selection and generation unit 155. Other implementations may include a different set of models and/or functional units. Furthermore, the functionality of two or more of the models described herein may be provided by a single model trained to perform multiple functions.

The title generation model 135 is an NLP model trained to analyze the document segments 125 to generate a title for the presentation content 190. The title generation model 135 is capable of analyzing document segments 125 in a first language and generating a title for the presentation content 190 in a second language, in some implementations. In such implementations, the user provides an indication of a desired target language with the source content 105 and/or the user selection 110. The title generated by the title generation model 135 is reflective of the presentation content 190. The title generation model 135 may be implemented using various types of neural network. In some implementations, the title generation model 135 is implemented using a Generative Pre-trained Transformer 3 (GPT-3) model that has been finetuned to generate title text that is similar to text generated by a human that understands the content included in the document segments 125. In other implementations, other types of models are used to implement the title generation model 135.

The bullet point item generation model 140 is configured to analyze the document segments 125 and generate bullet point items to be presented on the slides of the presentation content 190. The bullet point items may be sentences or phrases that summarize a portion of textual content of a document segment 125. Each slide of the presentation content 190 is typically associated with a particular topic, and the slide may include multiple bullet point items that are related to the topic of the slide. The bullet point item generation model 140 is implemented using a GPT-3 model that has been finetuned to generate the text of bullet point items in a wat that is similar to text generated by a human that understands the content included in the document segments 125. In other implementations, other types of models are used to implement the bullet point item generation model 140.

The transcript generation model 145 is configured to analyze the document segments 125 and to generate a transcript of a speech to be given as the presentation content 190 is presented to an audience. In some implementations, the transcript generation model 145 analyzes the document segments 125 and generates a transcript of the speech for the content included therein. In some implementations, the transcripts are divided up into segments that are included in a notes section of the slides of the presentation content 190. In other implementations, the transcript is displayed on a user interface of the presentation software via a teleprompter interface that may be read by the presenter. In some implementations, the transcript generation model 145 is provided a target presentation time as an input, and the transcript generation model 145 is configured to generate a transcript that should take an average presenter the target presentation time to read through the transcript during a presentation. In some examples, the transcript generation model 145 is also configured to receive feedback from presenters to tailor the transcripts generated to the speed which the user typically presents so that the model can more accurately generate a transcript of an appropriate length for the presenter. The transcript generation model 145 is implemented using a GPT-3 model that has been finetuned to generate the text of transcript in some implementations. In other implementations, other types of models are used to implement the transcript generation model 145.

The summary generation model 150 is configured to analyze the document segments 125 to generate a cover page or summary page of the content to be included in the presentation content 190. The summary generation model 150 is configured to generate a summary of the content included in the document segments 125. The summary provides an overview of the information included in the presentation content 190. The summary will typically be in a length that fits on a single slide of the presentation content 190. The summary generation model 150 is implemented using a GPT-3 model that has been fine tuned to generate the text of transcript in some implementations. In other implementations, other types of models are used to implement the summary generation model 150.

The image selection and generation unit 155 determines whether imagery associated with the document segments 125 may be incorporated into the presentation content 190. To achieve this, the image selection and generation unit 155 analyzes the imagery associated with the document segments 125 to determine whether the imagery may be incorporated into the presentation content. In some implementations, the image selection and generation unit 155 provides the imagery to an image analysis model configured to analyze the attributes of the imagery and to output a prediction of whether the imagery would be suitable for inclusion in the slides of the presentation content 190. In some examples, imagery associated with the document segments 125 is discarded if the dimensions of the image are less than a minimum image size threshold. Images smaller than the minimum image size threshold may appear pixelated or otherwise of poor quality if resized for use in the presentation content 190. The image selection and generation unit 155 may also be configured to analyze the imagery to identify placeholder images and/or other types of images that would be inappropriate to include in the presentation content 190. In a non-limiting example, the source content 105 is a web page that includes blank spacer elements, images representing control elements, header images, and other such imagery that would not be appropriate for inclusion in the presentation content 190. The image selection and generation unit 155 utilizes an image analysis model trained to identify such imagery in the document segments 125 so that this imagery can be discarded by the image selection and generation unit 155.

In some implementations, the image analysis model is trained to identify images containing potentially offensive subject matter so that the image selection and generation unit 155 can discard such images. In yet other implementations, the image analysis model may provide predicted subject matter information for each of the images associated with the document segments 125 to the image selection and generation unit 155, and the image selection and generation unit 155 compares the predicted subject matter of the images to a global blocklist to determine whether the images should be discarded and not included in the presentation content 190. The global blocklist is a list of subject matter curated by administrators of the presentation service that identifies potentially objectionable subject matter for which the image selection and generation unit 155 will not generate textual content and/or obtain or generate images to be included in the presentation content 190. The global blocklist may include language specific and/or geographical restrictions on the usage of certain terminology and/or subject matter which is objectionable in that language or geographical area but may not be objectionable in other languages and/or other geographical areas.

In some implementations, the image selection and generation unit 155 compares the images associated with the document segments 125 with the subject matter associated with a predicted subject matter of the document segment 125 to ensure that the image is actually relevant. In some instances, the location of an image within the source content 105 or the user selection 110 does not correspond to the textual content associated with that document segment 125. In such situations, the image selection and generation unit 155 discards such images or attempts to match the image with a document segment 125 that is associated with the same topic.

The image selection and generation unit 155 can also selectively obtain AI-generated imagery and/or non-AI-generated imagery for the presentation content 190. The source content 105 and/or the user selection 110 may not include any images in some instances or the images may be discarded for various reasons as discussed above. Furthermore, the image selection and generation unit 155 attempts to include at least one image per slide in some implementations, which may exceed the number of images associated with the source content 105 and/or the user selection 110. In such instances, the image selection and generation unit 155 attempts to obtain IA-generated images and/or non-AI-generated images to be included in the presentation content 190. The image selection and generation unit 155 is configured to utilize various safeguards when determining whether to utilize AI-generated imagery in the presentation content 190.

The search model 160 is configured to receive a document segment of the document segments 125 and/or the textual output of the title generation model 135, the bullet point generation model 140, the transcript generation model 145, and/or the summary generation model 150 for that document segment. The search model 160 formulates a search query for image content that is submitted to a search engine or search service. The search engine or search service is configured to search for non-AI-generated imagery that is available on the Internet or via other sources. The non-AI-generated imagery may be human-generated imagery, such as but not limited to photographs, drawings, paintings, and/or other types of imagery generated by a human. The non-AI-generated imagery may also include procedurally generated imagery that is not generated using AI. The search engine provides one or more images as search results, and the image selection and generation unit 155 may select one or more of these images to include in the presentation content 190. The images may be analyzed using one or more image analysis models to determine characteristics of the images, such as but no limited to image dimensions, primary color scheme of the image, media type (e.g., photograph, drawing, line drawing, painting, etc.), and/or other features of the images. In some implementations, the design stage 170 selects the images based on the design features of the slides being produced, and the image selection and generation unit 155 provides the images, the image characteristics, and the document segment with which the images are associated to the design stage 170 for processing.

The generation model 165 is configured to generate imagery based on a document segment of the document segments 125 and/or the textual output of the title generation model 135, the bullet point generation model 140, the transcript generation model 145, and/or the summary generation model 150 for that document segment. In some implementations, the use of AI-generated imagery is subject to various safeguards, discussed below, which prevent the inclusion of offensive or undesirable subject matter in the imagery produced for the presentation content 190. The image generation model may utilize various models to obtain the AI-generated imagery. These models may include but are not limited to DALL-E 2, Craiyon, and/or other such image generation models that are configured to generate imagery based on a textual input. In some implementations, the image selection and generation unit 155 is configured to formulate and send a query to a generation model 165 that is implemented by a third-party service and to receive the AI-generated imagery from the third-party service.

One safeguard provided by the image selection and generation unit 155, in some implementations, is the global blocklist maintained and applied for all users creating presentations. As discussed above, the image selection and generation unit 155 is configured to use the global blocklist to reject subject matter identified as potentially objectionable. The image selection and generation unit 155 will neither search for imagery nor user AI to generate imagery to be included in the presentation content 190 for subject matter included on the global blocklist. Language can evolve quickly, and words or phrases that were previously unobjectionable may take on new objectionable meanings. A technical benefit of utilizing a global blocklist is that an administrator can quickly update the global blocklist to promptly respond to such changes in language usage.

Anther safeguard provided by the image selection and generation unit 155, in some implementations, is an AI-generated image subject matter block list for subject matter that is not objectionable in and of itself but could cause confusion if included in AI-generated imagery. For example, the AI-generated image subject matter block list may specify that no photorealistic AI-generated imagery of real people, either living or dead may be included in the presentation content, because people seeing these images may mistake the AI-generated images for actual photographic representations of the person depicted in the images in a situation that may never really have happened. Another additional safeguard that may be added in some implementations is to prevent AI-generation of photorealistic images supposedly depicting historical events. The events being depicted in the images may either not have happened or be taken in an incorrect context when depicted in the AI-generated imagery.

Another safeguard provided by the image selection and generation unit 155, in some implementations, are user-specified limitations on when AI-generated images may be used instead of human-generated or other non-AI-generated images. An example user interface for configuring the user-specific limitations is shown in FIG. 4I, which is discussed in detail in the examples which follow.

The design stage 170 receives the output of the various models and the image selection and generation unit 155 of the transformation stage 130. The page segmentation unit 175 is configured to analyze the textual and/or image content provided by the transformation stage 130 and to determine whether the content should be divided into multiple pages of slides. This determination may be based at least on the presentation style and/or the content density selected by the user. The presentation style and content density selections are described in detail with respect to the user interface examples shown in FIGS. 4A-4I.

The page segmentation unit 175 provides the textual and/or image content associated with each page to the design template unit 180 which determines the layout of the slides. The design template unit 180 applies the selected presentation style to the slides. The presentation style may include a specified color scheme, font and/or font attributes for textual content, number of images to include per slide, and/or the positioning of the textual content and/images on each of the slides. In some implementations, the design template unit 180 uses a slide layout model to generate the slide layout. The slide layout model is a machine learning model trained to generate the slide layout based on a desired presentation style and the textual and image content for the slides. The model is trained using examples of slides of the various presentation styles that may be selected by the user.

In some implementations, the design template unit 180 and/or the slide layout model consider document attributes, content subject matter, and artistic design factors to automatically create visually compelling slides for the presentation. In some instances, the user has not chosen a presentation style to be applied to the slides, and the presentation stye of the slides is determined based on these considerations. In other instances, the user has selected a presentation style, and the presentation style is adapted according to these factors. These techniques also consider the user's intent and/or direction when creating the slides. Additional considerations, such as but not limited to historic documents that are similar in content, design, and/or use case may also be considered in some implementations. In implementations in which the design template unit 180 uses the slide layout model to generate the layout of the slides, the slide layout model may be trained using the historic documents to generate layouts for the slides. In yet other implementations, an organization or enterprise utilizes a set of templates, style guides, and/or other design rules and factors those into the slide creation and/or layout process. In some such implementations, the slide layout model is trained using training data based on these templates, style guides, and/or design rules to generate the layout for the slides.

In some implementations, the design template unit 180 is configured to use an image cropping model that is configured to crop either AI-generated or non-AI-generated imagery. The image cropping model is trained to crop images to a certain size or aspect ratio in some implementations, and the design template unit 180 may specify the desired size or aspect ratio as an input to the model. The image cropping model is trained to crop images so that features of interest within the image are cropped in a visually appealing manner.

The post processing unit 185 adds transcript information and/or speaker notes to the slides, if transcript and/or notes are available. The post processing unit 185 may also insert page numbers or slide number prompts into the transcript to prompt the user to cause a particular slide to be displayed. Once completed, the presentation content 190 is output by the design stage 170.

In some implementations, a feedback mechanism is provided that enables a user to provide feedback regarding the automatically generated textual content and imagery. This feedback may be used to further finetune the performance of the models utilized by the transformation stage 130 and/or the design stage 170. In some implementations, the feedback may be used to provide feedback for inappropriate and/or offensive imagery generated by the image generation model 165 and/or selected by the search model 160. In some implementations, the user may provide feedback on the layout and other design choices made by the design stage 170, which may be used to further finetune the models used for providing visually compelling slides in the presentation content 190.

Figure 2:
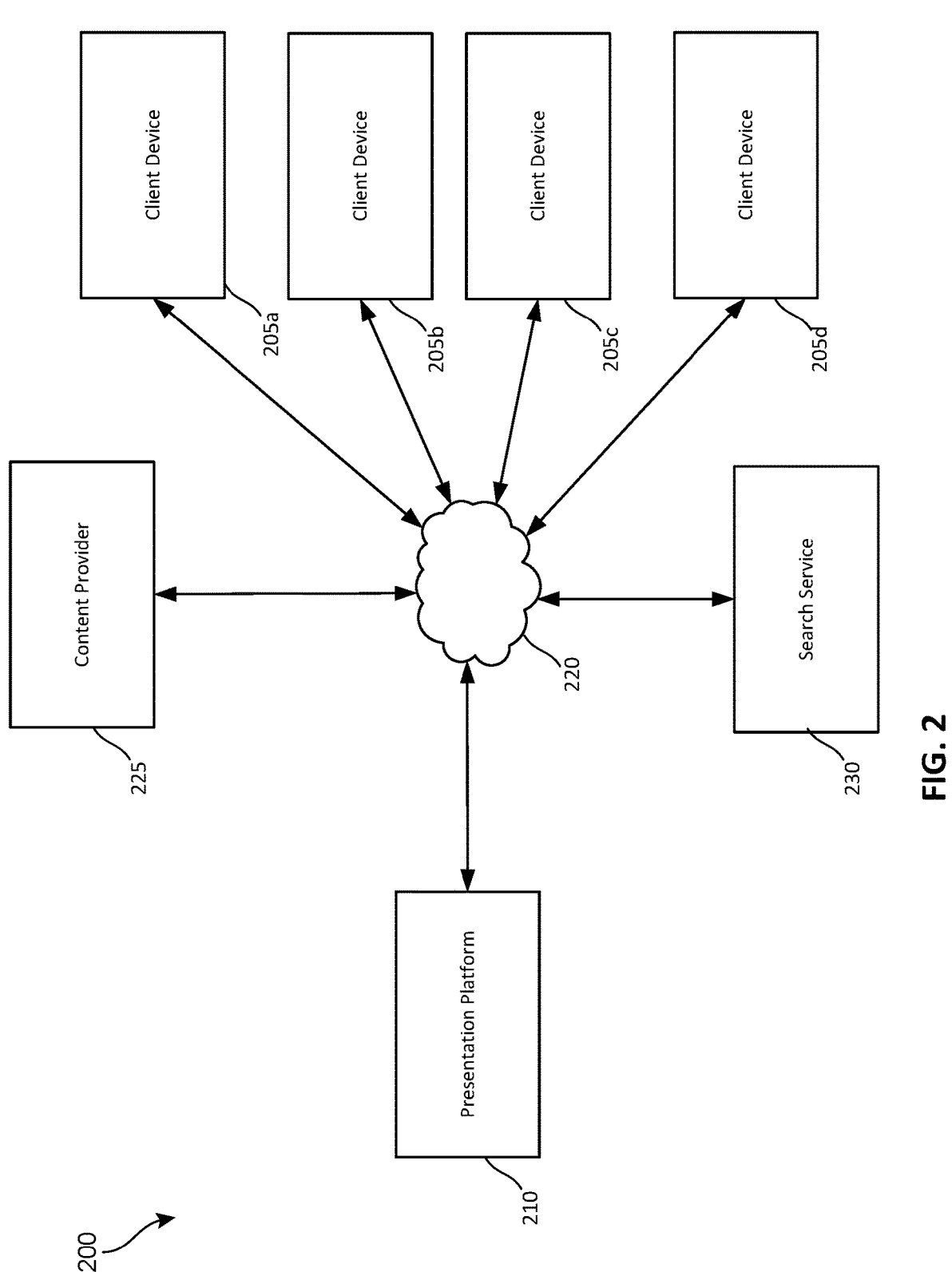
FIG. 2 is a diagram showing an example computing environment in which the techniques disclosed herein are implemented.

FIG. 2 is a diagram showing an example computing environment 200 in which the techniques disclosed herein for automatically generating presentation content may be implemented. The computing environment 200 includes a presentation platform 210. The example computing environment 200 also includes client devices 205a, 205b, 205c, and 205d (collectively referred to as client device 205). The client devices 205a, 205b, 205c, and 205d communicate with the presentation platform 210, the content provider 225, and/or the search service 230 via the network 220. Furthermore, the presentation platform 210 communicates with the content provider 225 and/or the search service 230 via the network 220. The network 220 may be a combination of one or more public and/or private networks and may be implemented at least in part by the Internet.

In the example shown in FIG. 2, the presentation platform 210 is implemented as a cloud-based service or set of services. The presentation platform 210 is configured to facilitate creation of presentation content and presenting the presentation content to a local and/or remote audience. The presentation platform 210 utilizes the techniques provided herein to automatically create presentation content for users. The presentation platform 210 may be implemented by a presentation platform, such as Microsoft PowerPoint Live®, which enables a presenter to present a presentation online and to invite users to view the presentation on their own devices. The presentation platform 210 may also be implemented by a communications platform, such as Microsoft Teams, which provides an online hub for team collaboration including chat and video conferencing. A presenter may utilize such a communications platform to conduct a meeting, a lecture, conference, or other such event online in which participants are able to communicate with the presenter as well as other participants via chat and audio and/or video conferencing. In such an online communications platform, a participant may serve as a presenter for part of an online communications session, while another participant may serve as a presenter for another part of the online.

The content provider 225 provides textual and/or image content that may be selected as the source content 105, the user selection 110, and/or the non-AI-generated content selected by the image selection and generation unit 155 for inclusion in the presentation content 190. The content provider 225 may provide one or more websites, web applications, and/or other sources of online content. While the example implementation shown in FIG. 2 includes a single content provider 225, the presentation platform 210 and/or the search service 230 may obtain content from multiple content providers 225.

The search service 230 implements a search engine that is configured to receive search queries and to search for content on the content provider 225. The presentation platform 210 can use the search service 230 to search for textual and/or image content that may be included in the presentation content 190.

The client devices 205*a*, 205*b*, 205*c*, and 205*d* are each a computing device that may be implemented as a portable electronic device, such as a mobile phone, a tablet computer, a laptop computer, a portable digital assistant device, a portable game console, and/or other such devices. The client devices 205*a*, 205*b*, 205*c*, and 205*d* may also be implemented in computing devices having other form factors, such as a desktop computer, vehicle onboard computing system, a kiosk, a point-of-sale system, a video game console, and/or other types of computing devices. While the example implementation illustrated in FIG. 2 includes four client devices, other implementations may include a different number of client devices 205 that may utilize the presentation platform 210 to create and/or present presentation content. Furthermore, in some implementations, the application functionality provided by the presentation platform 210 is implemented by a native application installed on the client devices 205*a*, 205*b*, 205*c*, and 205*d*, and the client devices 205*a*, 205*b*, 205*c*, and 205*d*.

Figure 3:
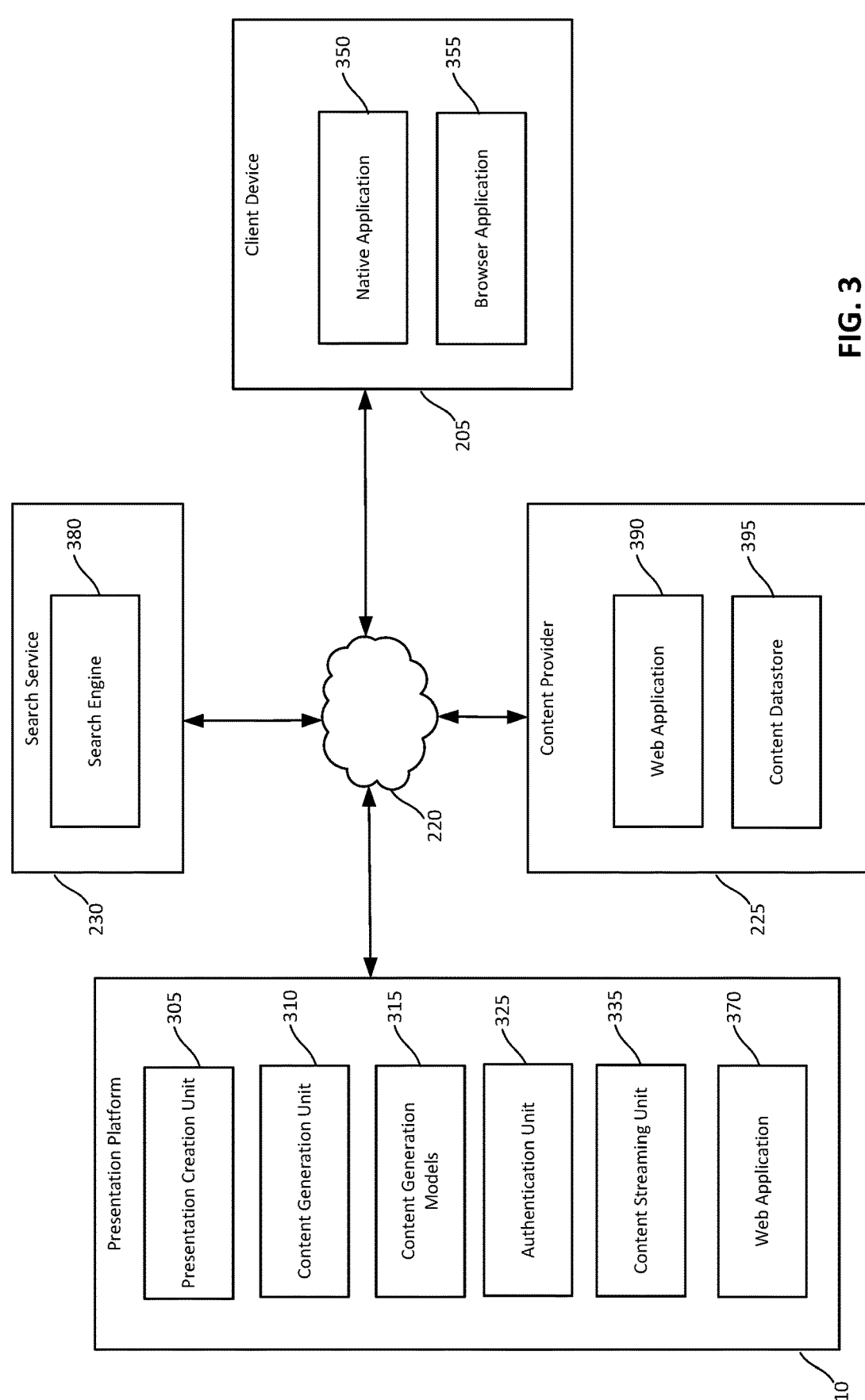
FIG. 3 is a diagram showing additional features of the presentation platform, the client device, the content provider, and the search service shown in FIG. 2.

FIG. 3 is a diagram showing additional features of the presentation platform 210, the client device 205, the search service 230, and the content provider 225. The presentation platform 210 includes a presentation creation unit 305, a content generation unit 310, content generation models 315, an authentication unit 325, a content streaming unit 335, and a web application 370.

The presentation creation unit 305 provides tools that enable a use to create new presentation content and/or modify an existing presentation content. The presentation creation unit 305 enables the user to add textual content, imagery, and/or other content to the presentation content. In some implementations, the presentation platform implements a web application 370 that is accessible from the browser application 355 and/or the native application 350 of the client device 205.

The content generation unit 310 is configured to generate the presentation content 190 using the techniques shown in FIG. 1. The content generation unit 310 utilizes the content generation models 315 to transform the source content 105 and/or the user selection 110 into a format that can be utilized on the presentation slides. The content generation unit 310 also utilizes the content generation models 315 to create AI-generated imagery for some presentation content 190 according to the various safeguards discussed in the preceding examples.

The authentication unit 325 provides functionality for verifying whether users are permitted to access the services provided by the presentation platform 210. In some implementations, the authentication unit 325 provides functionality for receiving authentication credentials for the users from their respective client device 205. The authentication unit 325 may be configured to verify that the authentication credentials are valid and permit the users to access the services provided by the presentation platform 210 responsive to the authentication credentials being valid.

The content streaming unit 335 is used to stream audio visual content associated with a presentation to a remote audience. The content streams may include audio and/or video stream of the presenter of a presentation. The audio and/or video stream of the presenter may be captured by the client device 205 of the presenter and sent to the presentation platform 210. The content streams may also include a video stream of the presentation content, such as the current slide of a presentation. The content streams are sent by the presentation platform to the client devices 205 of the audience. The presentation content may also be presented to a local audience through a projector or video screen that is configured to receive the presentation content from the client device 205 of the presenter and/or from the presentation platform 210.

The web application 370 can be accessed by the browser application 355 or browser-enabled instance of the native application 350 of the client devices 205*a*-105*d*. The web application 370 provides a user interface for creating, modifying, and/or presenting presentation content. The web application 370 provides a user interface similar to that shown in FIGS. 4A-4I in some implementations.

The search service 230 includes a search engine 380 that is configured to receive queries for content from the presentation platform 210 and/or the client device 205. The search results may include web pages, imagery, videos, documents, and/or other types of electronic content. The search results may be ranked by relevance based on search terms included in the query provided to the search service 230. The search service 230 provides the search results to the presentation platform 210 or the client device 205 from which the search query originated 230.

The content provider 225 includes a web application 390 and a content datastore 395. In some implementations, the content provider 225 provides a web application 390 that provides textual content and/or imagery that may be used as the source content 105 or the user selection 110 by the presentation platform 210. The content datastore 395 is a persistent datastore that stores the imagery and/or textual content maintained by the content provider 225. The search service 230 is configured to search for content in the content datastore 395 and/or provided by the web application 390.

The client device 205 includes a native application 350 and/or a browser application 355, in some implementations. The native application 350 is configured to communicate with the presentation platform 210 and the search service 230 and/or the content provider 225. The native application

350 can send requests to the presentation platform 210 to create new presentation content and/or to modify existing presentation content.

The browser application 355 is an application for accessing and viewing web-based content, which may be provided by web application 370 of the presentation platform 210. The web application 370 enables the user to utilize the services of the presentation platform 210 in a similar manner as the native application described above. In some implementations, the presentation platform 210 supports both the native application 350 and the web application 370, and the users may choose which approach best suits their needs.

Figure 4A:
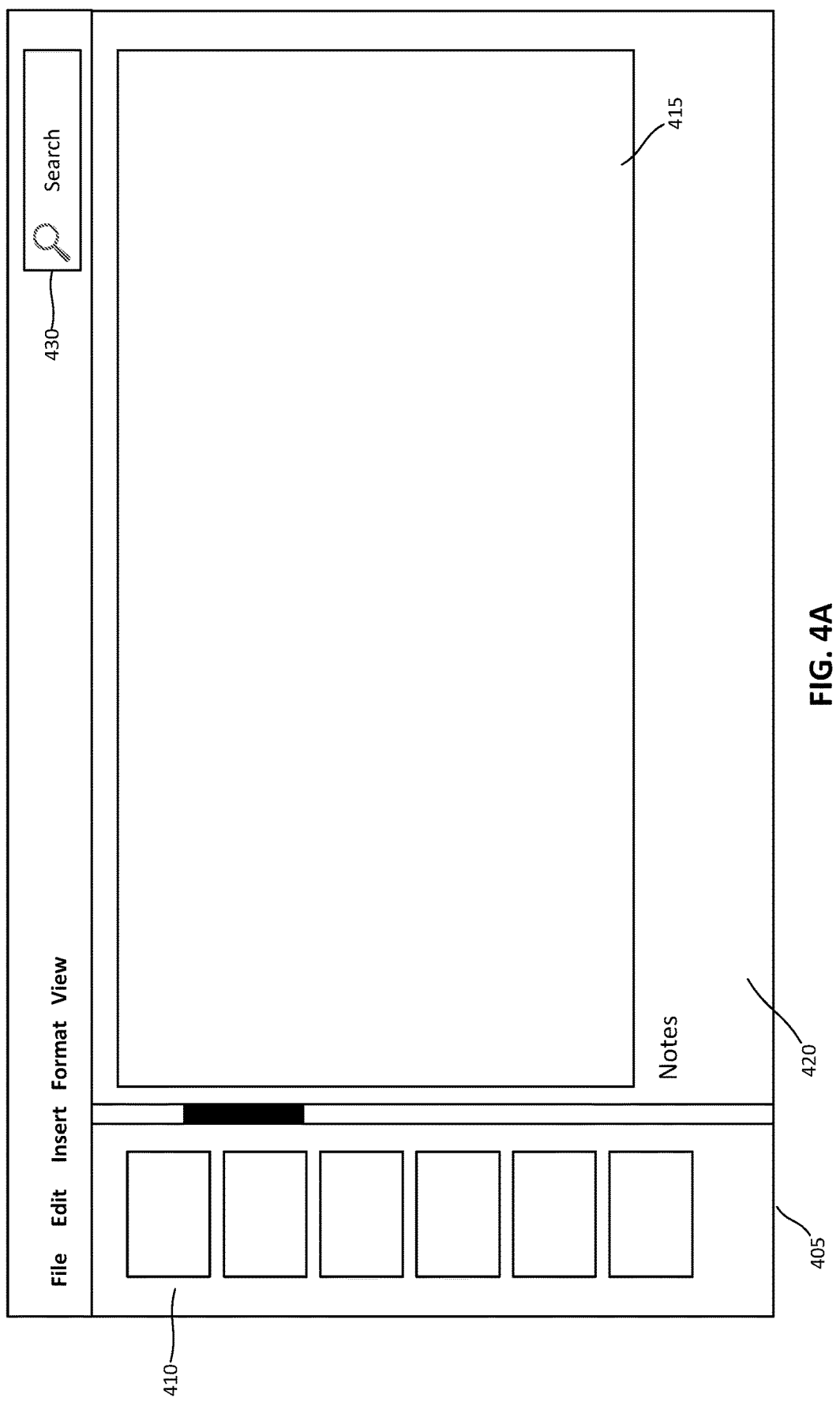

FIGS. 4A-4I are diagrams of an example user interface 405 showing various aspects of the functionality for automatically generating presentation content provided herein. FIG. 4A shows an example of the user interface 405, which includes a content pane 415 that is used to display a currently selected slide or a first slide in a deck of slides of a presentation if no slide has been selected. The user may edit the slide being shown in the content pane 415. The slides pane 410 provides a representation of the slides included in the slide deck. The user can click on or otherwise activate one of these representations to cause the slide associated with that representation to be shown in the content pane 415. The notes pane 420 is used to display notes and/or transcript information associated with each slide. The notes information may be used by the presenter of a presentation to recall what they plan to say while presenting the presentation content 190. The notes information is typically hidden when presenting the presentation locally or streaming the presentation to a remote audience. The search field 430 allows the user to enter search terms for searching content to be included in the slides and/or for searching for content to be used to automatically generate content for the slides.

Figure 4B:
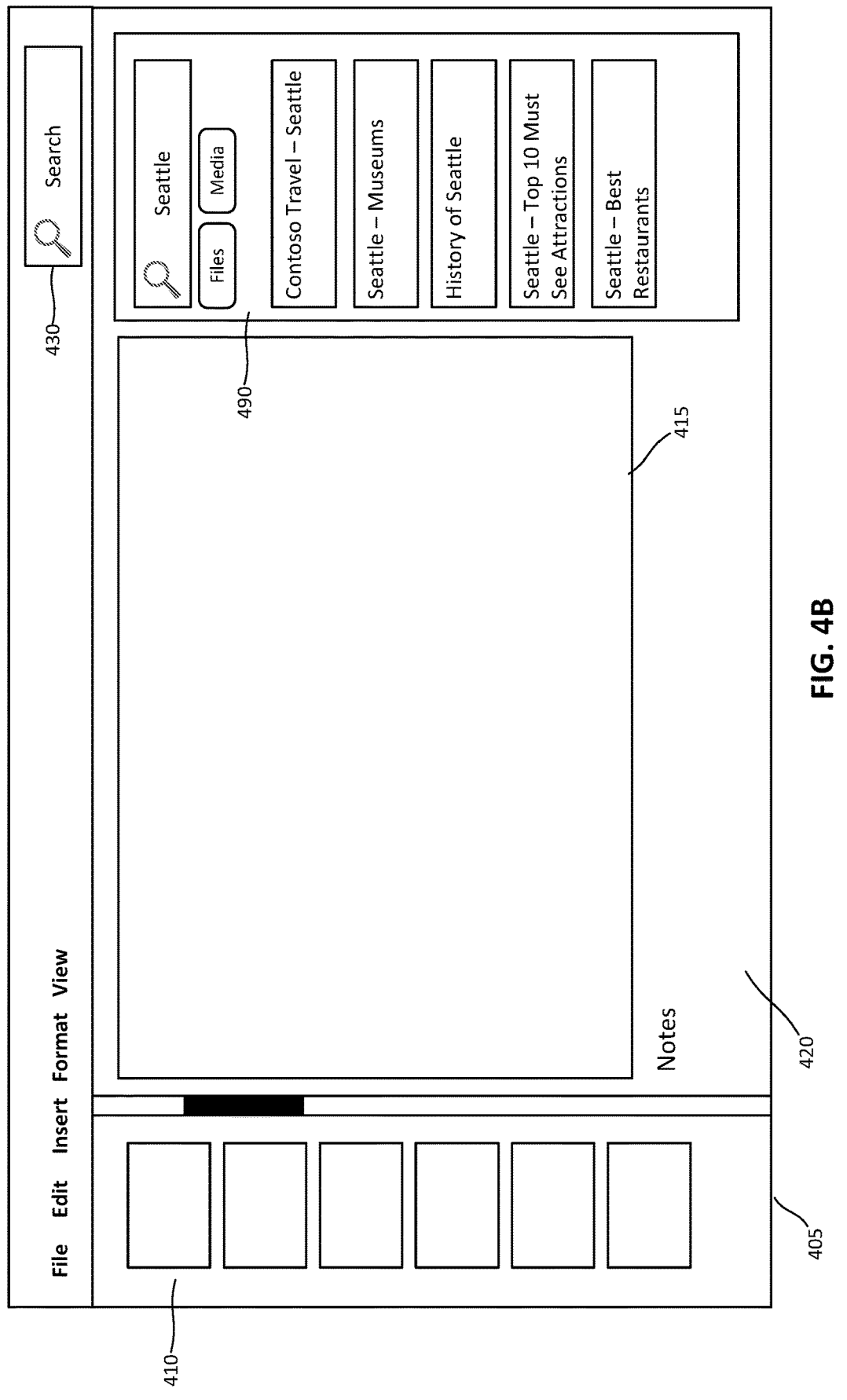

FIG. 4B shows an example of the user interface 405 in which the user has invoked the search pane 490 to conduct a search for content related to the city of Seattle. The search pane 490 can be invoked by typing a search term into the search field 430. The search terms used in the search and the search results are presented to the user. In some implementations, the user may apply filters, such as but not limited to a "files" filter to limit the search results to files or a "media" filter to limit the search results to images, video, or other media that may be incorporated into a presentation.

Figure 4C:
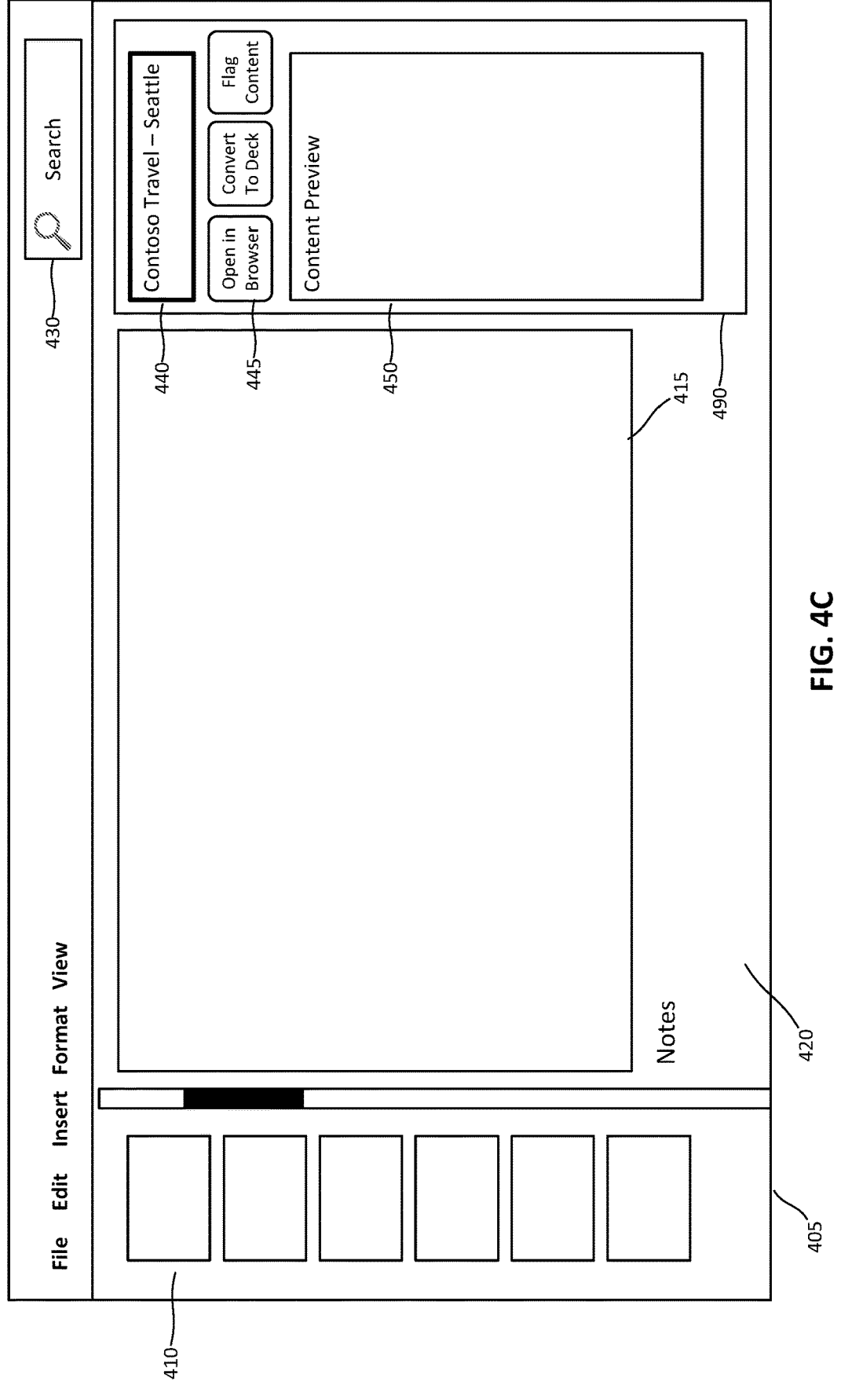

FIG. 4C shows an example of the user interface 405 in which the user has selected a search result from the list of search results, and the contents of the search pane 490 have been updated to show controls 445 and content preview pane 450. The controls 445 include controls for opening the content in the browser application 355, a control for converting the search result item to a slide deck, and control for flagging objectionable content. The control for opening the content in the browser application 355 provides the user with an opportunity to view the search result in its entirety in the browser application 355. This provides the user with an opportunity to review the search result in its entirety before making a decision whether to utilize the search result to generate a slide deck. Furthermore, in some implementations, the user may select a portion of the content item to be used to generate the presentation content 190. The control for converting the search result to a slide deck causes the search result to be submitted as the source content 105 to be transformed into the presentation content 190, according to the techniques described in the preceding examples. The control for flagging inappropriate content notifies an administrator to review the search result for potential inclusion in the global blocklist. In some implementations, clicking on or otherwise activating the control for flagging inappropriate content hides the search results and may also update the user-specified limitations on content described above to block such search results in the future. The content preview pane 450 shows a thumbnail or preview of the search result that provides a high level view of the contents of the search result. The preview may provide sufficient information to the user to determine whether they would like to investigate the search result further by reviewing them in the browser application 355 or generate a slide deck from the search result.

Figure 4D:
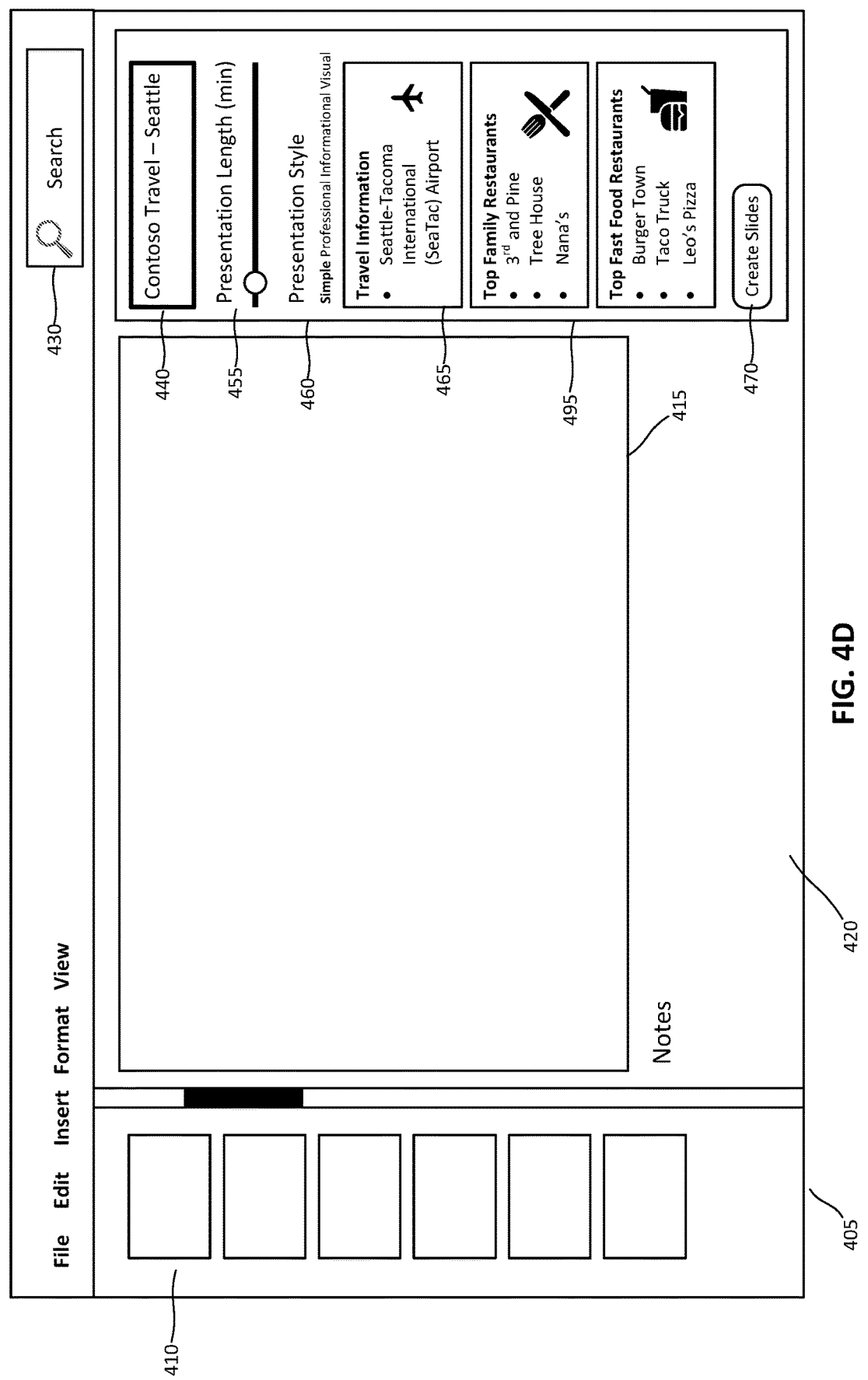
Figure 4E:
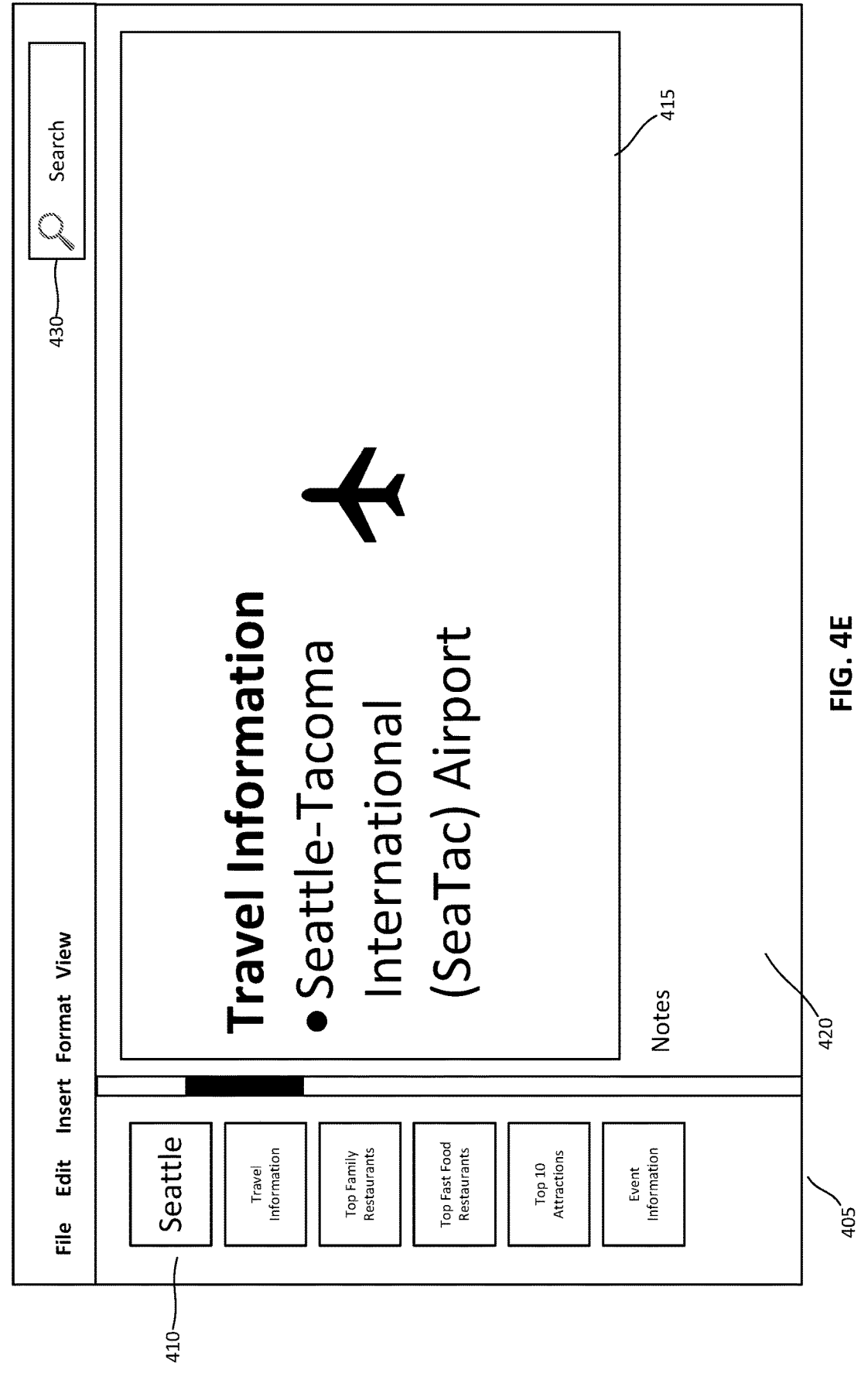

FIG. 4D is an example of the user interface 405 in which a create slides pane 495 is shown. The create slides pane 495 may be displayed in response to the user clicking on or otherwise activating the control for converting the search result into a slide deck shown in FIG. 4C. The create slides pane 495 includes an identifier pane 440 that identifies the search result for which the slide deck may be generated. The create slides pane 495 includes a presentation length control 455, a presentation style selector control 460, a preview slides control 465 showing what a selected presentation style would look like if used to generate the presentation content 190, and a create slides control 470. The presentation length control 455 is a control that allows the user to select a desired length of time for the presentation in minutes. The desired presentation length can be used by the models of the transformation stage 130 to generate a transcript or talking points for the presentation content 190 that are predicted to take the desired amount of time to present. The presentation style control 460 allows the user to select a presentation style to be applied to the presentation content 190 from among a set of predetermined presentation styles. As discussed in the preceding examples, the design template unit 180 of the design stage 170 can use the selected presentation style to determine the layout of the slides of the presentation content 190. Activating the create slides control 470 causes the presentation service 210 to generate the presentation content 190 according to the techniques described herein. FIG. 4E shows an example of the user interface 405 depicting slides having been created based on a webpage on the city of Seattle. The user may then further customize the slides using the various tools available via the user interface 405.

Figure 4F:
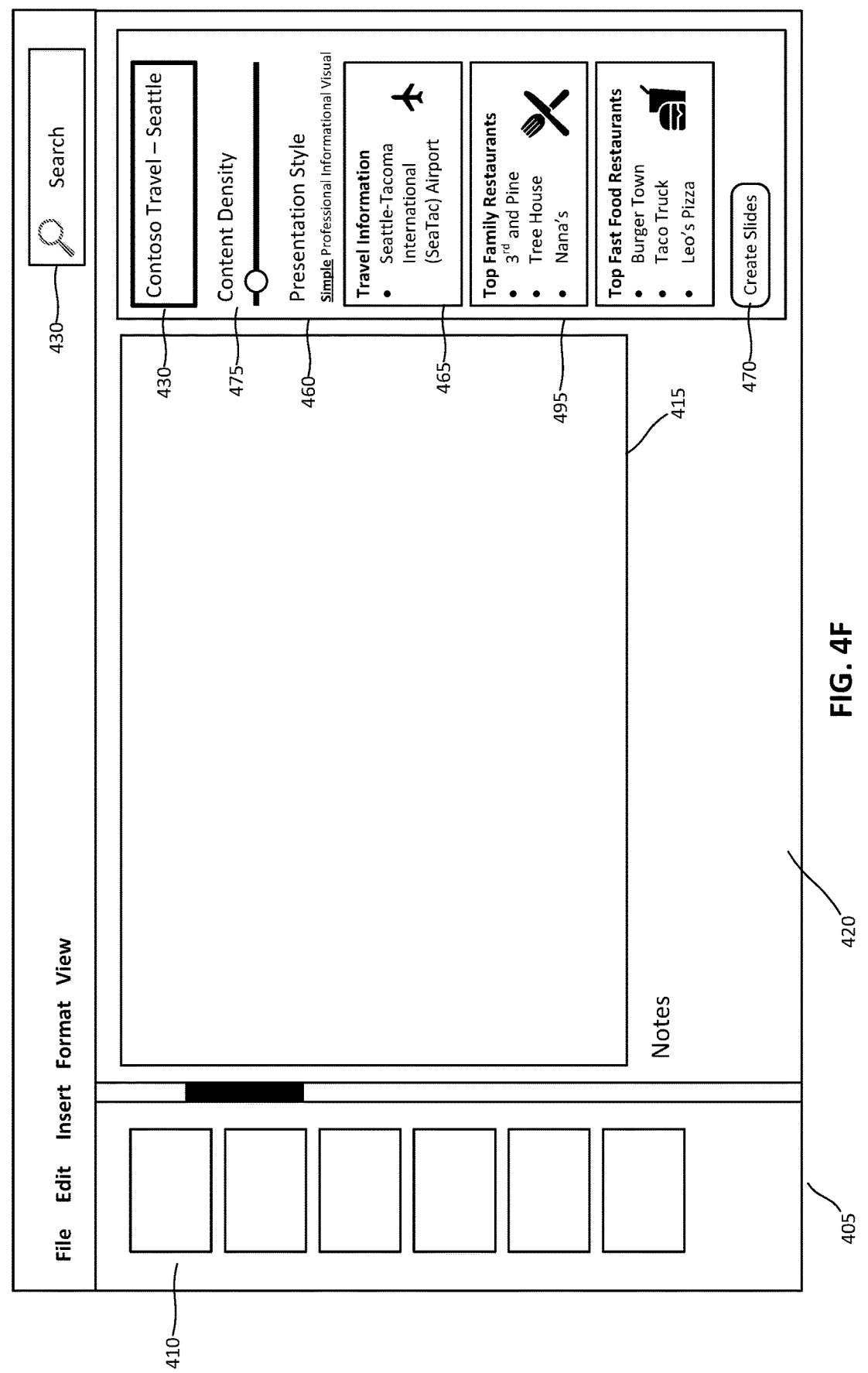

FIG. 4F shows another example of the user interface 405 in which the create slides pane 495 includes a content density control 475. The content density control 475 provides the user with the ability to control how much textual and/or image information is included on each slide. A presenter may choose to select a lower content density for slides that convey complex or potentially confusing concepts to ensure that the audience is not overwhelmed by the amount of information included on the slides. A presenter may choose to select a higher content density for other presentations. The content density selected by the user is provided to the one or more models used by the transformation stage 130, in some implementations, to determine how much information to include on each slide. The page segmentation unit 175 also takes the selected content density into consideration when determining whether to segment the content associated with a particular document segment into multiple slides and may subdivide the content into fewer slides where a higher content density is desired.

Figure 4G:
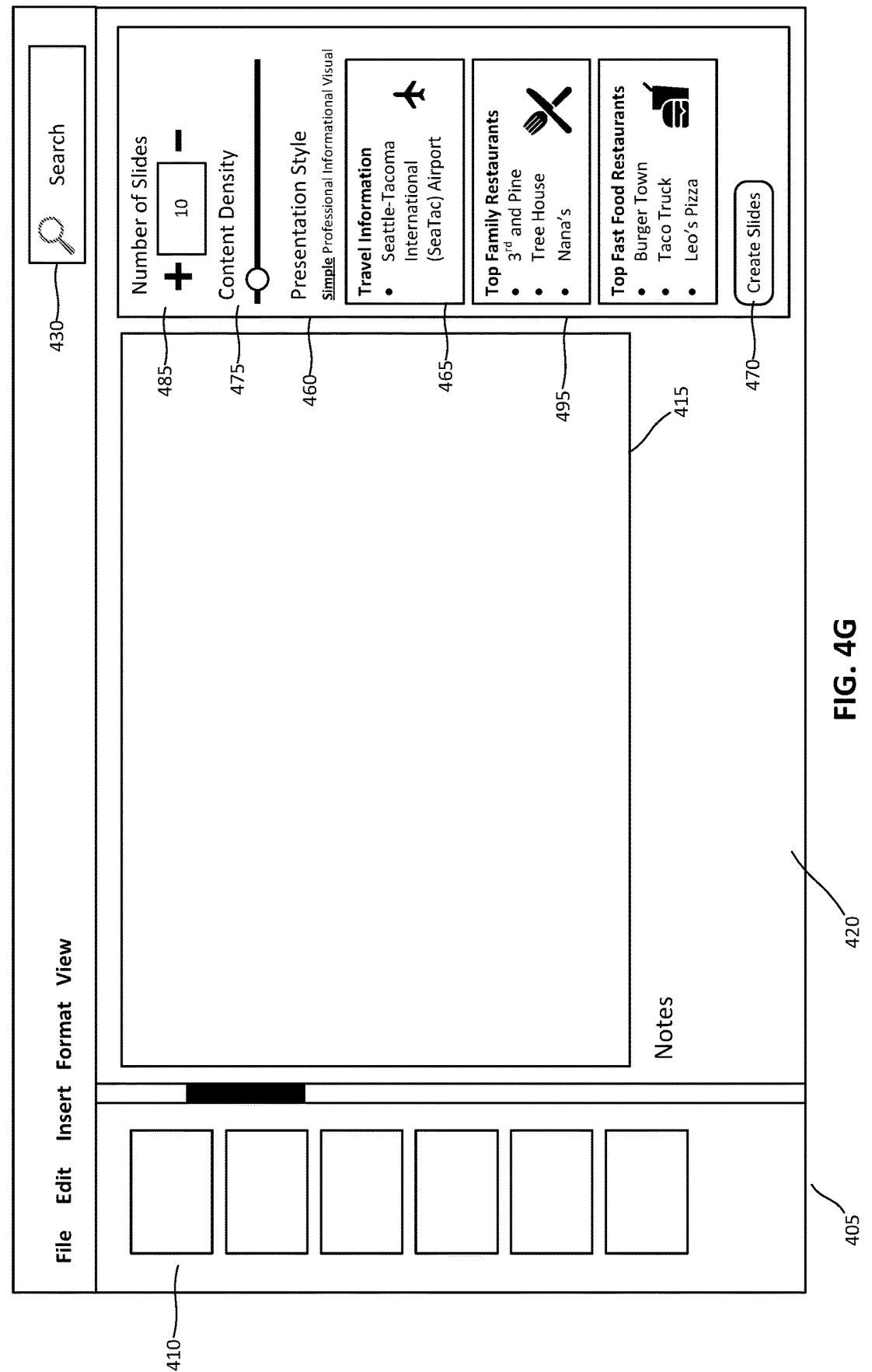

FIG. 4G is yet another example of the user interface 405 in which the create slides pane 495 includes a number of slides control 485 which allows the user to specify how many slides they would like to include in the presentation content 190. The transformation stage 130 and the design stage 170 can utilize the specified number of slides to determine how much information and/or imagery to include on each of the slides so that the presentation content 190 contains the desired number of slides.

Figure 4H:
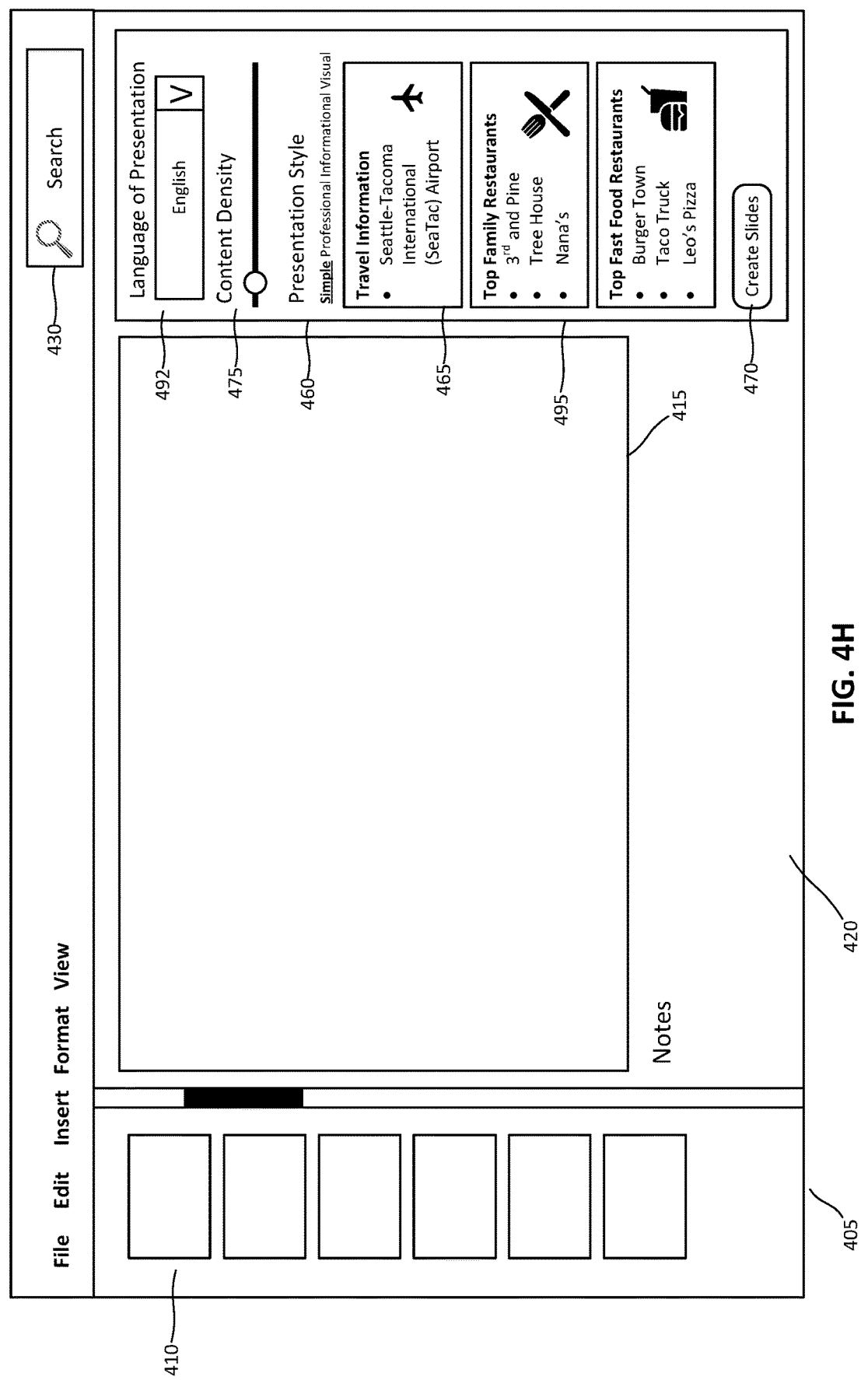

FIG. 4H is yet another example of the user interface 405 in which the create slides pane 495 includes language control 492 in which the user may specify the target language in which the slides will be generated. In the example shown in FIG. 4H, the user may select a target language from the dropdown menu from among the languages supported by the models used by the transformation stage 130 to generate the presentation content 190.

The example implementations of the create slides pane 495 include various controls to more clearly illustrate some of the controls that may be provided for supporting various features of the techniques provided herein. Furthermore, the controls included in these example implementations of the create slides pane 495 are not limited to these specific combinations, and the controls shown in these examples may be included in different combinations in other implementations. Moreover, the create slides pane 495 may include additional controls not shown in these examples in addition to those that have been shown.

FIG. 4I shows yet another example of the user interface 402 in which the user can configure the user-specified limitations on when AI-generated may be used instead of human-generated and/or non-AI-generated images. The client device 205 of the user and/or the presentation platform 210 store the user-specified limitation information, in some implementations. In the example implementation shown in FIG. 4I, the user-specified limitations are associated with the user profile of the user who is utilizing the presentation software. The user may access the user profile to configure via the user interface 405 from the "File" menu or via another control presented on the user interface 405 not shown in this example implementation. In the example implementation shown in FIG. 4I, the user defines rules that indicate when AI-generated imagery is not to be created. If the conditions of a particular rule are satisfied by the document segment, then no AI-generated imagery can be generated for that document segment even if the generation of such imagery would not violate any of the other safeguards discussed herein. In some implementations, if one of the rules is violated, then no AI-generated imagery may be utilized in the creation of the presentation content 190. Other implementations may utilize other approaches for implementing the user-specified limitations on when AI-generated imagery may be included in the presentation content 190.

Figure 5:
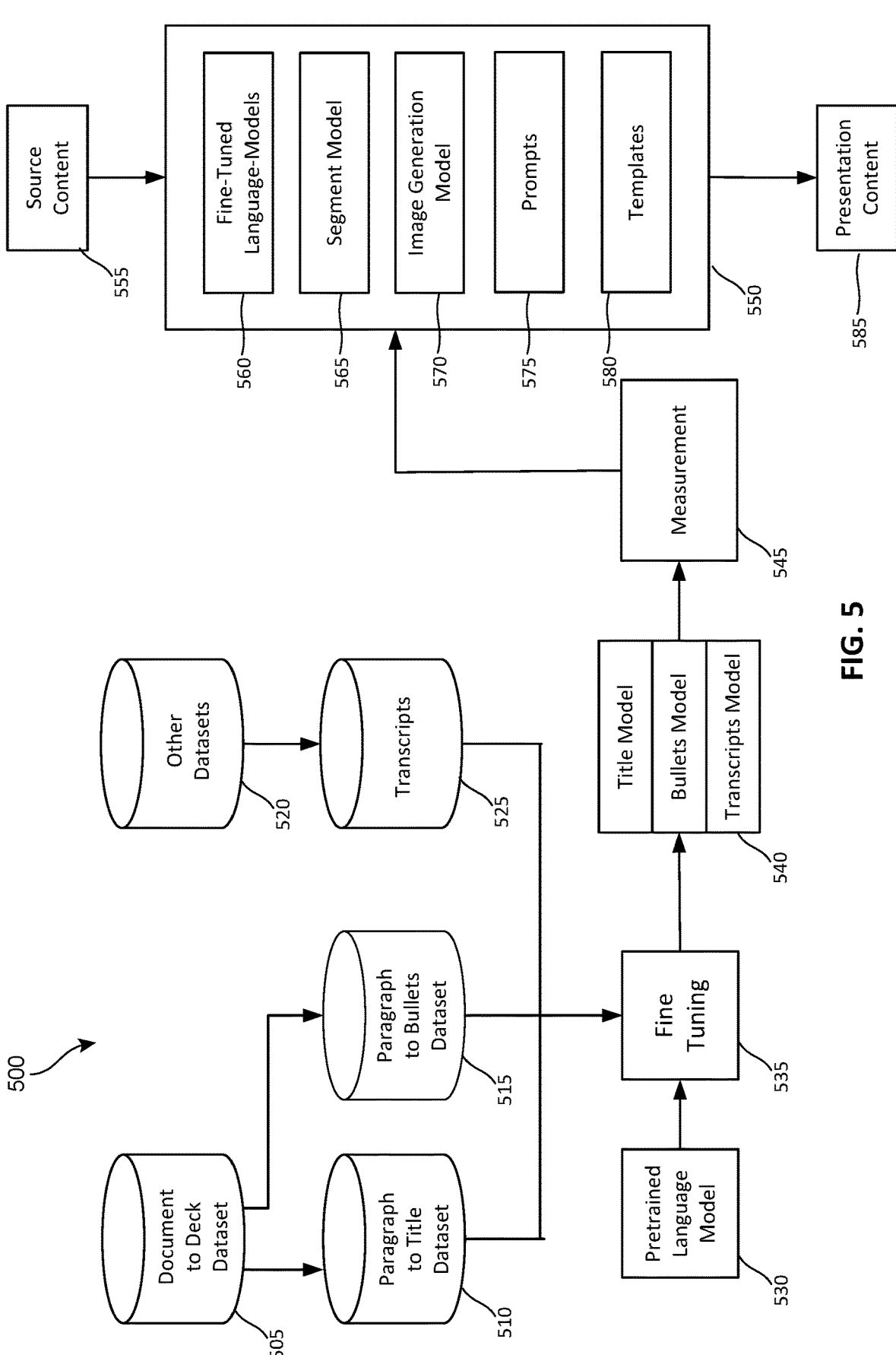
FIG. 5 is an example flow diagram of an example process for training machine learning models according to the techniques provided herein.

FIG. 5 is a flow diagram showing an example process 500 for training the various machine learning models used in the techniques provided herein. In some implementations, the process begins with a pretrained language model 530. In some implementations, the pretrained language model 530 is a GPT-3 model, but other implementations can utilize other types of natural language processing models. The pretrained language model 530 is finetuned 535 to generate one or more fine-tuned language models 540 capable of receiving textual content, such as the source content 105 and/or the user selection 110 discussed in the preceding examples, as an input and transforming that content into various aspects of the presentation content 190. The pretrained language model 530 is fine-tuned using various sets of training data that help the model learn to generate various elements of the presentation content 190.

In the example shown in FIG. 5, the training data used for finetuning includes a document to deck dataset 505, a paragraph to title dataset 510, a paragraph to bullet point item dataset 515, other datasets 520, and a transcripts dataset 525. The document to deck dataset 505 include examples of documents and corresponding slide presentations that are derived from these documents. The documents may include a variety of types of electronic documents, web pages, and/or other electronic content. The documents may have a variety of different formats, such as but not limited to white papers, journal articles, newspaper or online articles, books, and/or other types of documents for which corresponding presentation content has been created. The document to deck dataset 505 helps finetune the model for generating slide content from corresponding electronic documents. The paragraph to title dataset 510 includes examples of one or more paragraphs of textual content being associated with a title representative of the corresponding paragraphs of textual content. This dataset helps finetune the model for generating the titles for the slide presentation as a whole and/or for individual slides. The paragraph to bullets dataset 515 includes examples of paragraphs being transformed into bullet point items to be presented on a slide. The paragraph to bullets dataset 515 helps to finetune the model for generating the bullet point items derived from the source content 105 and/or the user selection 110. The paragraph to title dataset 510 and the paragraph to bullets dataset 515 is derived from the document to deck dataset 505 in some implementations to provide the model with a consistent set of data for finetuning model to generate the various elements of the slides of the presentation content 190.

The other datasets 520 may include online video and audio sources from which the transcript dataset 525 may be derived. Ideally, the online video and audio sources are video or audio recordings of a presentation associated with a document included in the document to deck dataset 505. This provides an opportunity to train the model on the audio or video of an actual presentation associated with a document used for finetuning the model.

In some implementations, the performance of the one or more fine-tuned language models 540 are measured to determine whether the models are performing as expected. The performance can be tested using various metrics. In some implementations, the outputs of fine-tuned models can be compared side by side with human-generated titles, bullet point items, transcripts, etc. to determine how well the fine-tuned model is performing. In other implementations, a slide-level Recall-Oriented Understudy for Gisting Evaluation (ROUGE)-SL score is calculated for each of the slides included in the presentation content output by the fine-tuned models. Other implementations may utilize other metrics for assessing the performance of the models in addition to or instead of one or both of the techniques described herein.

Once the fine-tuned models have ben generated, the presentation content generator 550 can be implemented. The presentation content generator 550 can be used to implement the techniques shown in the preceding examples. The source content 555 is similar to the source content 105 shown in FIG. 1, and the presentation content 585 is similar to the presentation content 585 shown in FIG. 1. The fine-tuned language models 560 can be used to implement the models used to transform the source content 555 into various textual elements of the slides of the presentation content 585. The fine-tuned language models 560 can be used to implement the various models of the transformation stage 130 shown in FIG. 1. The segment model 565 can be used to implement the page-level segmentation of the page segmentation unit 175 and/or the segmentation unit 120 of the segmentation stage 115 shown in FIG. 1. The image generation model 570 can be used to implement a text-to-image generation model used by the image selection and generation unit 155 of the transformation stage 130 shown in FIG. 1. In some implementations, the image generation model 570 is a stable diffusion model, while other implementation are implemented using other types of image generation models. The prompts model 575 can be used to provide the presenter with prompts that can be included in the notes section of the slides, such as those shown in FIGS. 4A-4G. The templates 580 can be used by the design template unit 180 of the design stage 170 shown in FIG. 1.

Figure 6A:
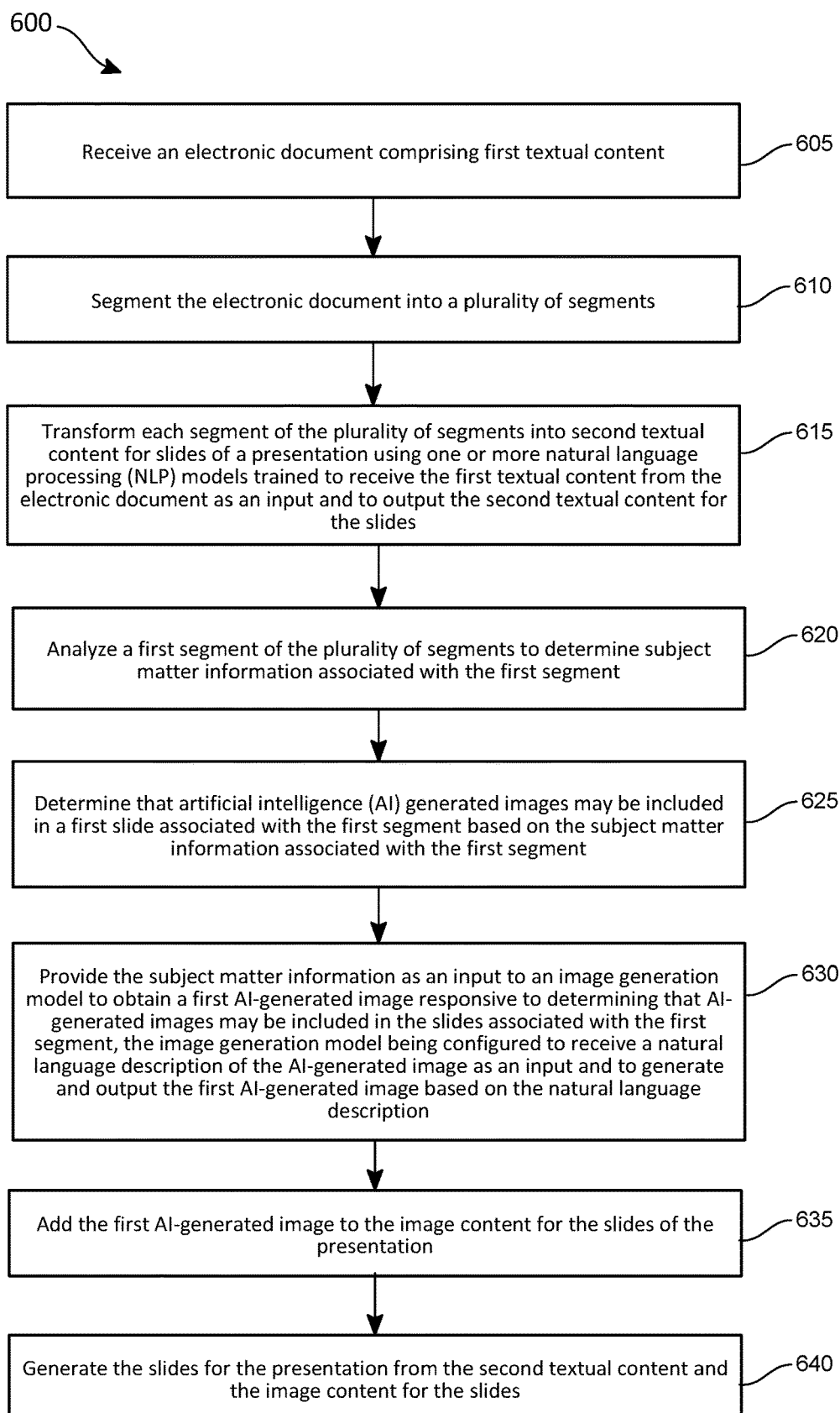
FIG. 6A is an example flow chart of an example process for generating presentation content according to the techniques provided herein.

FIG. 6A is an example flow chart of an example process 600 for automatically generating presentation content. The process 600 may be implemented by the presentation platform 210 and/or the client device 205 using the techniques described in the preceding examples. The process 600 includes an operation 605 of receiving an electronic document comprising first textual content. The electronic document may be the source content 105 or the user selection 110 discussed in the preceding examples. The process 600 includes an operation 610 of segmenting the electronic document into a plurality of segments. The segmentation stage 115 segments the electronic document into a set of document segments 125.

The process 600 includes an operation 615 of transforming each segment of the plurality of segments into second textual content for slides of a presentation using one or more NLP models trained to receive the first textual content from the electronic document as an input and to output the second textual content for the slides. The transformation stage 130 uses one or more NLP models used to generate various textual and/or image components for the slides of the presentation.

The process 600 includes an operation 620 of analyzing a first segment of the plurality of segments to determine subject matter information associated with the first segment and an operation 625 of determining that AI generated images may be included in a first slide associated with the first segment based on the subject matter information associated with the first segment. The image selection and generation unit 155 determines whether AI-generated images may be included in the slides of the presentation. This determination is based at least in part on the safeguards discussed in the preceding examples, such as the global blocklist, the AI-generated subject matter block list, and/or the user-specified limitations on AI-generated images.

The process 600 includes an operation 625 of determining that artificial intelligence (AI) generated images may be included in a first slide associated with the first segment based on the subject matter information associated with the first segment and an operation 630 of providing the subject matter information as an input to an image generation model to obtain a first AI-generated image responsive to determining that AI-generated images may be included in the slides associated with the first segment. The image generation model is configured to receive a natural language description of the AI-generated image as an input and to generate and output the first AI-generated image based on the natural language description. The image generation model 165 used by the image selection and generation unit 155 is configured to generate AI-based imagery from a textual prompt. The techniques herein can use the subject matter associated with a particular slide to obtain an AI-generated image that represents the subject matter of the slide.

The process 600 includes an operation 635 of adding the first AI-generated image to image content for the slides of the presentation and an operation 640 of generating the slides for the presentation from the second textual content and the image content for the slides. As discussed in the preceding examples, the transformation stage 130 adds the AI-generated images to the slide content, and the design stage 170 incorporates the slide information into the layout of the slides included in the presentation content 190.

In some implementations, generating the slides for the presentation from the second textual content and the image content for the slides includes generating a layout of the slides for the presentation using a layout model. The layout of the presentation slides is determined by slide layout model of the design template unit 180. The slide layout model is trained to determine the layout of the slides in a way that makes sense, is visually appealing, and clearly communicates the contents of the slides. The slide layout model is trained using examples of various types of slides having the various presentation styles that are supported. In some implementations, the slide layout model processes images, such as but not limited to applying a filter the images, cropping the image, and/or resizing the images. The slide layout model positions the images on the slides along with the textual content of the slides. In some implementations, the slide layout model adds additional visual elements, such as but not limited to slide borders or backgrounds, and/or drop-shadows. The slide layout model is trained to generate compelling slides of a level of quality that a human designer would be expected to produced, but automates this process to automatically create visually compelling slide layouts.

FIG. 6B is an example flow chart of another example process 650 for automatically generating presentation content. The process 650 may be implemented by the presentation platform 210 and/or the client device 205 using the techniques described in the preceding examples. The process 600 includes an operation 655 of receiving an electronic document comprising first textual content. The electronic document may be the source content 105 or the user selection 110 discussed in the preceding examples.

The process 600 includes an operation 660 of segmenting the electronic document into a plurality of segments. The segmentation stage 115 segments the electronic document into a set of document segments 125. The process 600 includes an operation 665 of transforming each segment of the plurality of segments into second textual content for slides of a presentation using one or more NLP models trained to receive the first textual content from the electronic document as an input and to output the second textual content for the slides. The transformation stage 130 uses one or more NLP models used to generate various textual and/or image components for the slides of the presentation.

The process 600 includes an operation 670 of analyzing a first segment of the plurality of segments to determine subject matter information associated with the first segment and an operation 625 of determining that AI generated images may be included in a first slide associated with the first segment based on the subject matter information associated with the first segment. The image selection and generation unit 155 determines whether AI-generated images may be included in the slides of the presentation. This determination is based at least in part on the safeguards discussed in the preceding examples, such as the global blocklist, the AI-generated subject matter block list, and/or the user-specified limitations on AI-generated images.

The process 600 includes an operation 675 of determining that AI generated images may be included in a first slide associated with the first segment based on the subject matter information and safeguard information for AI-generated images and an operation 680 of providing the subject matter information as an input to an image generation model to obtain a first AI-generated image responsive to determining that AI-generated images may be included in the slides associated with the first segment. The image generation model is configured to receive a natural language description of the AI-generated image as an input and to generate and output the first AI-generated image based on the natural language description. The image generation model 165 used by the image selection and generation unit 155 is configured to generate AI-based imagery from a textual prompt. The techniques herein can use the subject matter associated with a particular slide to obtain an AI-generated image that represents the subject matter of the slide.

The process 600 includes an operation 685 of adding the first AI-generated image to image content for the slides of the presentation and an operation 690 of generating the slides for the presentation from the second textual content and the image content for the slides. As discussed in the preceding examples, the transformation stage 130 adds the AI-generated images to the slide content, and the design stage 170 incorporates the slide information into the layout of the slides included in the presentation content 190. In some implementations, generating the slides for the presentation from the second textual content and the image content for the slides includes generating a layout of the slides for the presentation using a layout model as discussed with respect to operation 640 of FIG. 6A.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
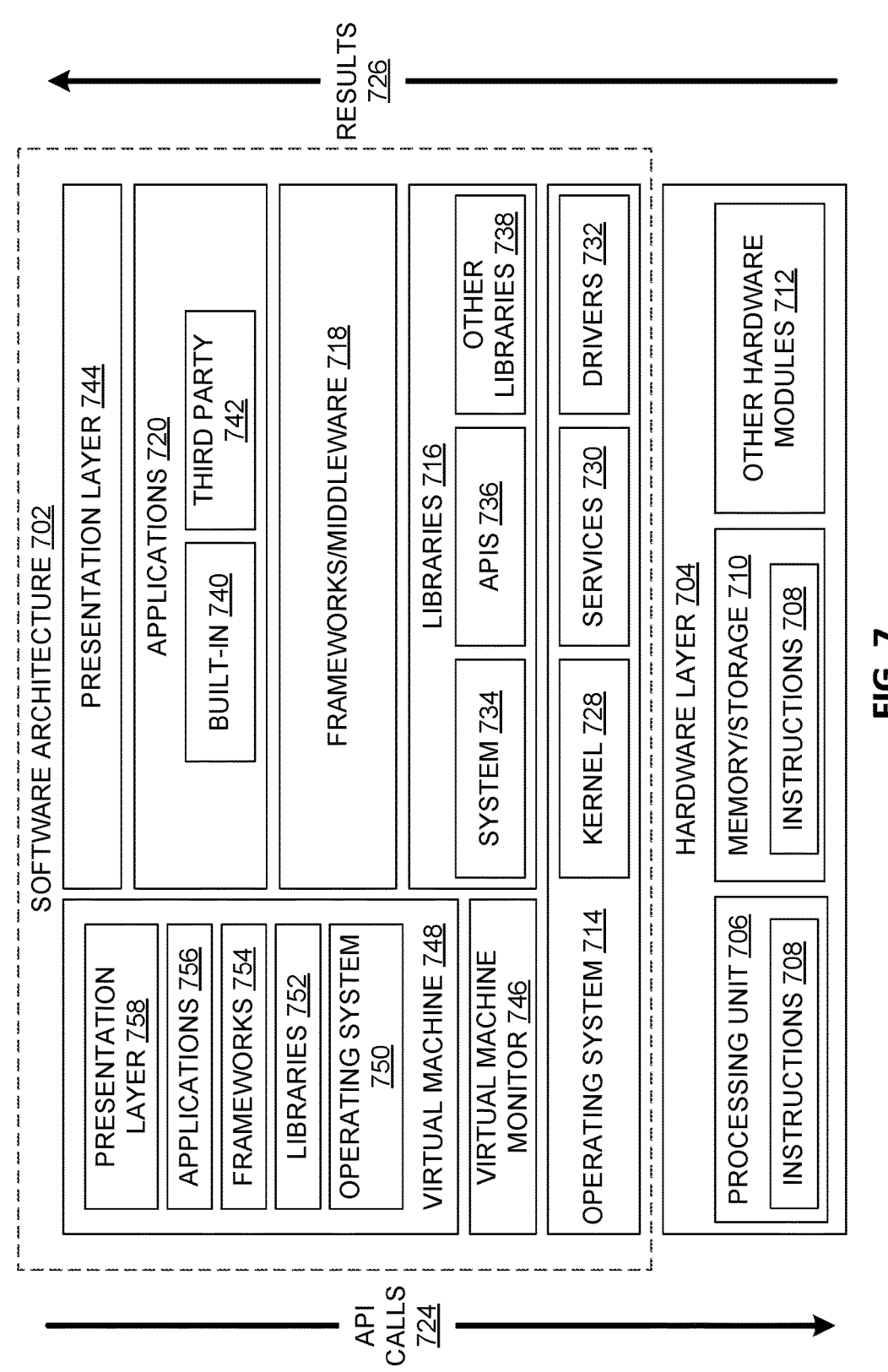
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
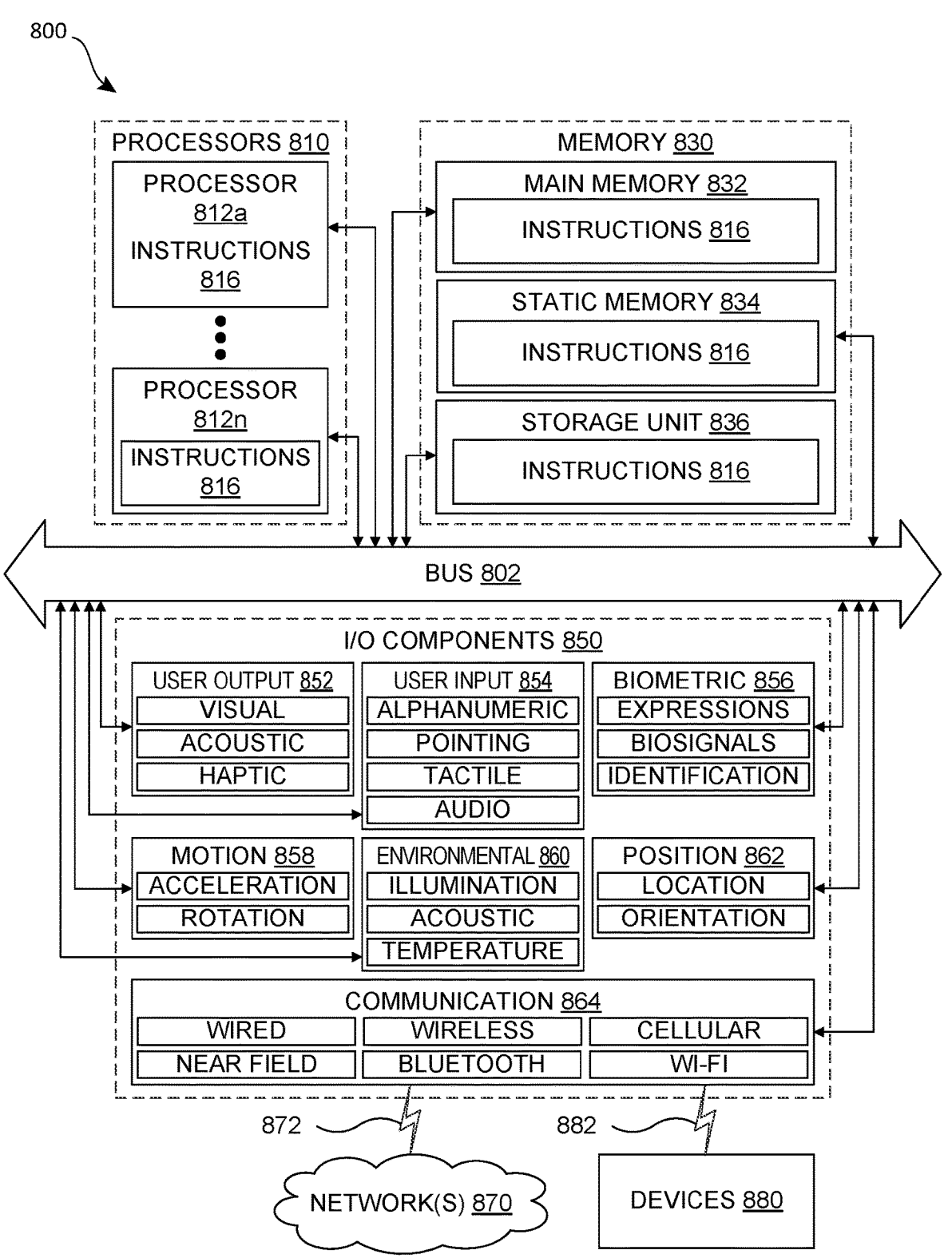
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable storage medium storing executable instructions that, when executed, cause the processor to perform operations of:
  receiving an electronic document comprising first textual content;
  segmenting the electronic document into a plurality of segments;
  transforming each segment of the plurality of segments into second textual content for slides of a presentation using one or more natural language processing (NLP) models trained to receive the first textual content from the electronic document as an input and to output the second textual content for the slides;
  analyzing a first segment of the plurality of segments to determine subject matter information associated with the first segment,
  determining that artificial intelligence (AI) generated images may be included in a first slide associated with the first segment based on the subject matter information associated with the first segment;
  providing the subject matter information as an input to an image generation model to obtain a first AI-generated image responsive to determining that AI-generated images may be included in the slides associated with the first segment, the image generation model being configured to receive a natural language description of the first AI-generated image as an input and to generate and output the first AI-generated image based on the natural language description;
  adding the first AI-generated image to image content for the slides of the presentation; and generating the slides for the presentation from the second textual content and the image content for the slides.

2. The data processing system of claim 1, wherein the machine-readable storage medium further includes instructions configured to cause the processor to perform operations of:

analyzing a second segment of the plurality of segments to determine second subject matter information associated with the second segment, determining that AI-generated images may not be included in a second slide associated with the first segment based on the second subject matter information associated with the second segment;

requesting, from a search engine, imagery associated with a second subject matter associated with the second segment;

receiving a set of imagery from the search engine;

selecting a second image from among the set of imagery received from the search engine; and adding the second image to the image content for the slides of the presentation.

3. The data processing system of claim 1, wherein generating the slides for the presentation from the second textual content and the image content for the slides further comprises:

providing the second textual content and the image content to a slide layout model configured to receive the second textual content and the image content and to layout the second textual content and the image content on the slides.

4. The data processing system of claim 1, wherein segmenting the electronic document into a plurality of segments further comprises:

providing the electronic document to a trained segmentation model trained to analyze the electronic document and to segment the electronic document into segments based on the subject matter information of each of the segments.

5. The data processing system of claim 1, wherein determining that AI-generated images may be included in a first slide associated with the first segment based on the subject matter information associated with the first segment further comprises:

comparing the subject matter information of the first segment to a global block list comprising subject matter for which inclusion of AI-generated images in the slides is prohibited; and determining that AI-generated images may be included in the first slide based on the subject matter information not being prohibited by the global block list.

6. The data processing system of claim 1, wherein determining that AI-generated images may be included in a first slide associated with the first segment based on the subject matter information associated with the first segment further comprises:

comparing the subject matter information of the first segment to a user-specified limitation information, the user-specified limitation information identifying subject matter for which AI-generated images may not be included in the slides; and determining that AI-generated images may be included in the first slide based on the subject matter information not being prohibited by the user-specified limitation information.

7. The data processing system of claim 1, wherein the machine-readable storage medium further includes instructions configured to cause the processor to perform operations of:

determining that the first segment of the electronic document includes a first image;

analyzing attributes of the first image to determine whether the first image is suitable for inclusion in the slides; and discarding the first image responsive to determining that the first image is unsuitable for inclusion in the slides.

8. The data processing system of claim 7, wherein the machine-readable storage medium further includes instructions configured to cause the processor to perform operations of:

responding to determining that the first image is unsuitable for inclusion in the slides, providing the subject matter information as an input to an image generation model to obtain a second AI-generated image; and adding the second AI-generated image to the image content for the slides of the presentation.

9. The data processing system of claim 7, wherein analyzing attributes of the first image to determine whether the first image is suitable for inclusion in the slides further comprises:

determining whether dimensions of the first image meet or exceed a minimum dimension threshold; and discarding the first image responsive to determining that the dimensions of the first image do not exceed the minimum dimension threshold.

10. The data processing system of claim 7, wherein analyzing attributes of the first image to determine whether the first image is suitable for inclusion in the slides further comprises:

determining that the first image is associated with a second subject matter unrelated to a first subject matter associated with the first segment; and discarding the first image responsive to determining the first image is associated with the second subject matter unrelated to the first subject matter associated with the first segment.

11. The data processing system of claim 1, wherein the electronic document comprises first textual content in a first language; and wherein transforming each segment of the plurality of segments into second textual content further comprises translating from the first language to a second language.

12. A data processing system comprising:

a processor; and a machine-readable storage medium storing executable instructions that, when executed, cause the processor to perform operations of:

receiving an electronic document comprising first textual content;

segmenting the electronic document into a plurality of segments;

transforming each segment of the plurality of segments into second textual content for slides of a presentation using one or more natural language processing (NLP) models trained to receive the first textual content from the electronic document as an input and to output the second textual content for the slides;

analyzing a first segment of the plurality of segments to determine subject matter information associated with the first segment, determining that artificial intelligence (AI) generated images may be included in a first slide associated with the first segment based on the subject matter information and safeguard information for AI-generated images;

providing the subject matter information as an input to an image generation model to obtain a first AI-generated image responsive to determining that AI-generated images may be included in the slides associated with the first segment, the image generation model being configured to receive a natural language description of the first AI-generated image as an input and to generate and output the first AI-generated image based on the natural language description;

adding the first AI-generated image to image content for the slides of the presentation; and generating the slides for the presentation from the second textual content and the image content for the slides.

13. The data processing system of claim 12, wherein the safeguard information includes a global blocklist comprising subject matter for which inclusion of AI-generated images in the slides is prohibited.

14. The data processing system of claim 12, wherein the safeguard information includes user-specified limitation information identifying subject matter for which AI-generated images may not be included in the slides.

15. The data processing system of claim 12, wherein the machine-readable storage medium further includes instructions configured to cause the processor to perform operations of:

determining that the first segment of the electronic document includes a first image;

analyzing attributes of the first image to determine whether the first image is suitable for inclusion in the slides; and discarding the first image responsive to determining that the first image is unsuitable for inclusion in the slides.

16. The data processing system of claim 15, wherein the machine-readable storage medium further includes instructions configured to cause the processor to perform operations of:

responsive to determining that the first image is unsuitable for inclusion in the slides, providing the subject matter information as an input to an image generation model to obtain a second AI-generated image; and adding the second AI-generated image to the image content for the slides of the presentation.

17. A method implemented in a data processing system for automatically generating presentation content, the method comprising:

receiving an electronic document comprising first textual content;

segmenting the electronic document into a plurality of segments;

transforming each segment of the plurality of segments into second textual content for slides of a presentation using one or more natural language processing (NLP) models trained to receive the first textual content from the electronic document as an input and to output the second textual content for the slides;

analyzing a first segment of the plurality of segments to determine subject matter information associated with the first segment, determining that artificial intelligence (AI) generated images may be included in a first slide associated with the first segment based on the subject matter information associated with the first segment;

providing the subject matter information as an input to an image generation model to obtain a first AI-generated image responsive to determining that AI-generated images may be included in the slides associated with the first segment, the image generation model being configured to receive a natural language description of the first AI-generated image as an input and to generate and output the first AI-generated image based on the natural language description;

adding the first AI-generated image to image content for the slides of the presentation; and generating the slides for the presentation from the second textual content and the image content for the slides.

18. The method of claim 17, wherein generating the slides for the presentation from the second textual content and the image content for the slides further comprises:

providing the second textual content and the image content to a slide layout model configured to receive the second textual content and the image content and to layout the second textual content and the image content on the slides.

19. The method of claim 17, wherein segmenting the electronic document into a plurality of segments further comprises:

providing the electronic document trained to a segmentation model configured to analyze the electronic document and to segment the electronic document into segments based on the subject matter information of each of the segments.

20. The method of claim 17, wherein determining that AI-generated images may be included in a first slide associated with the first segment based on the subject matter information associated with the first segment further comprises:

comparing the subject matter information of the first segment to a global block list comprising subject matter for which inclusion of AI-generated images in the slides is prohibited; and determining that AI-generated images may be included in the first slide based on the subject matter information not being prohibited by the global block list.

* * * * *